United States Patent [19]

Kosman et al.

[11] Patent Number: 4,783,137
[45] Date of Patent: Nov. 8, 1988

[54] FIBER OPTIC COUPLING SYSTEM

[76] Inventors: Karel J. Kosman, 7218 Cardinal Ln., Longmont, Colo. 80501; Richard F. Cantwell, 3026 11th St., Boulder, Colo. 80302; Robert E. Dutton, 7621-B Olympia Dr., Bakersfield, Calif. 93309; William A. Gibson, 4091 Longhorn Dr., Lafayette, Colo. 80026; Vernon R. Hargrave, 1674 N. Western, Longmont, Colo. 80501; Matthew L. McConnell, 2156 Grove Cor. W. #8, Boulder, Colo. 80302; David W. Roecker, 137 S. Humboldt, Denver, Colo. 80209; Jerry L. Fife, 7126 Cedarwood Cir., Boulder, Colo. 80301

[21] Appl. No.: 757,987
[22] PCT Filed: Oct. 17, 1984
[86] PCT No.: PCT/US84/01686
§ 371 Date: Jul. 3, 1985
§ 102(e) Date: Jul. 3, 1985
[87] PCT Pub. No.: WO85/02271
PCT Pub. Date: May 23, 1985

Related U.S. Application Data

[63] Continuation-in-part of Ser. No. 552,030, Nov. 15, 1983.

[51] Int. Cl.[4] ............ G02B 6/28; G02B 6/36; G02F 1/00
[52] U.S. Cl. ................ 350/96.16; 350/96.20; 350/96.21; 350/96.22; 350/96.29; 250/227; 455/600; 455/606; 455/612; 455/613; 455/617
[58] Field of Search ............ 350/96.10, 96.15, 96.16, 350/96.21, 96.20, 96.22, 96.29; 250/227; 370/4, 1; 455/600, 606, 607, 608, 612, 613, 617, 618, 619, 610

[56] References Cited

U.S. PATENT DOCUMENTS

| 3,912,362 | 10/1975 | Hudson | 350/96.20 |
|---|---|---|---|
| 4,053,764 | 10/1977 | Sierak et al. | 350/96.15 |
| 4,132,461 | 1/1979 | Jacques et al. | 350/96.21 |
| 4,165,496 | 8/1979 | DiDomenico, Jr. et al. | 350/96.15 |
| 4,186,996 | 2/1980 | Bowen et al. | 350/96.20 |
| 4,193,661 | 3/1980 | d'Auria et al. | 350/96.15 |
| 4,198,119 | 4/1980 | Uberbacher | 350/96.21 |
| 4,289,373 | 9/1981 | Sugimoto et al. | 350/96.16 |
| 4,289,398 | 9/1981 | Robichaud | 350/96.15 |
| 4,341,438 | 7/1982 | Seki et al. | 350/96.16 |
| 4,362,358 | 12/1982 | Hafle | 350/96.16 |
| 4,362,359 | 12/1982 | Dammann et al. | 350/96.19 |
| 4,366,565 | 12/1982 | Herskowitz | 370/1 |
| 4,381,881 | 5/1983 | Bell | 350/96.16 |
| 4,381,882 | 5/1983 | Sabine | 350/96.20 |
| 4,399,563 | 8/1983 | Greenberg | 455/601 |
| 4,430,572 | 2/1984 | Eve et al. | 455/610 X |
| 4,432,992 | 1/1984 | Porter | 350/96.15 |
| 4,436,366 | 3/1984 | Abramson | 350/96.20 |
| 4,444,461 | 4/1984 | Wey et al. | 350/96.21 |
| 4,465,335 | 8/1984 | Eppes | 350/96.21 |
| 4,474,431 | 10/1984 | Bricheno | 350/96.15 |
| 4,478,487 | 10/1984 | Obeissart | 350/96.21 |
| 4,551,829 | 11/1985 | Dragoo et al. | 350/96.16 |
| 4,668,044 | 5/1987 | D'Auria et al. | 350/96.15 |
| 4,695,126 | 9/1987 | Cook | 350/96.21 |

FOREIGN PATENT DOCUMENTS

| 2724850 | 7/1978 | Fed. Rep. of Germany | 350/96.15 |
|---|---|---|---|
| 55-98702 | 7/1980 | Japan | 350/96.15 |

Primary Examiner—William L. Sikes
Assistant Examiner—Brian M. Healy
Attorney, Agent, or Firm—Shoemaker and Mattare

[57] ABSTRACT

A fiber optic coupling device for providing simultaneous bi-directional transmission of optical signals within a single wavelength band over a single fiber optic link cable, including a coupler/connector which precisely aligns and longitudinally separates transmit and receive lightguide fibers and a fiber optic link cable. The cores of the transmit and receive lightguide fibers are tightly aligned with a minimum thickness of cladding for increased packing efficiency, and the end faces of the transmit and receive lightguides are maintained parallel to and a predetermined distance from an end face of the fiber optic link cable to ensure that reflected signals will not be detected as received signals and allow simultaneous distinguishable bi-directional communication of optical data within a single wavelength band.

40 Claims, 19 Drawing Sheets

LED CONTROL CIRCUIT 104

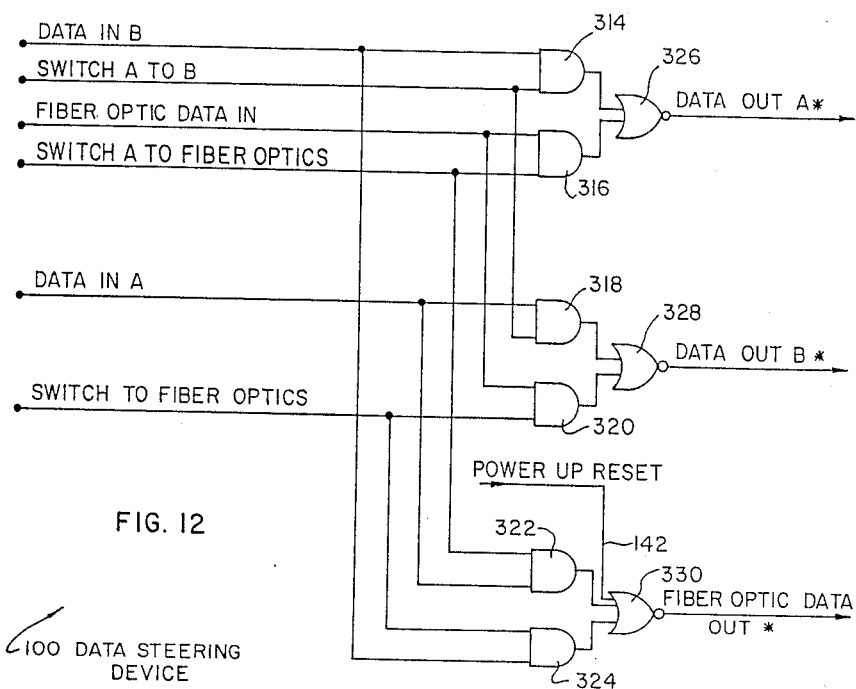
FIG. 12
100 DATA STEERING DEVICE
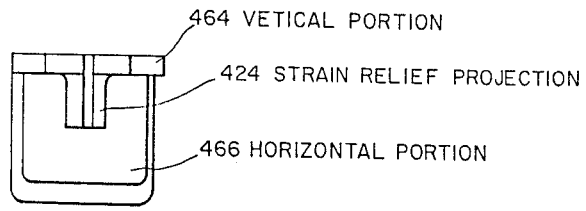
FIG. 23
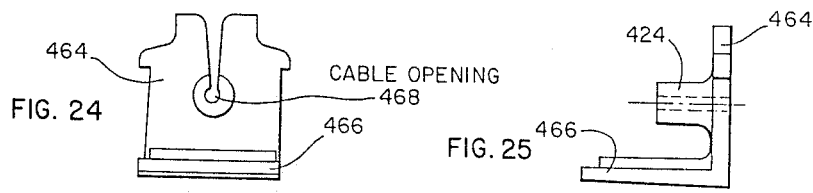
FIG. 24
FIG. 25

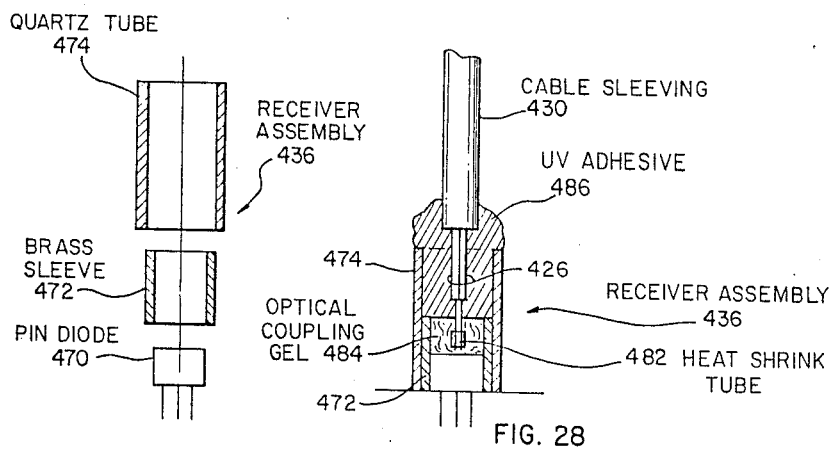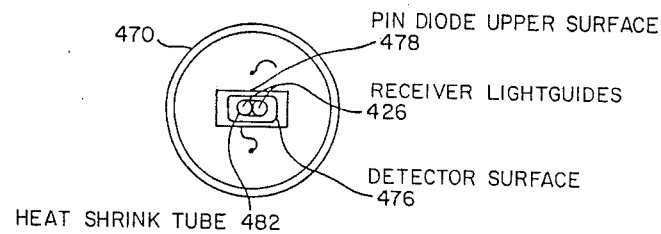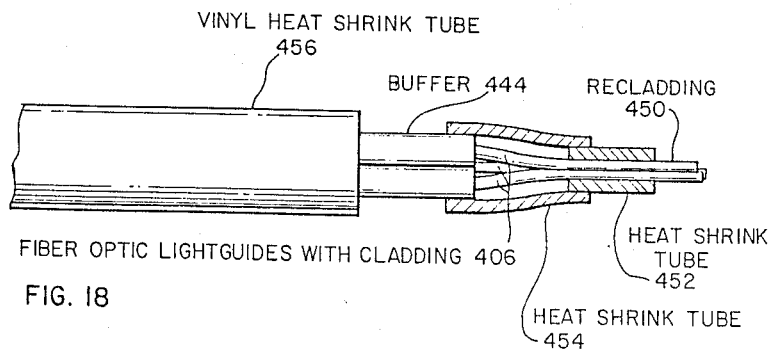

FIBER OPTIC COUPLING SYSTEM

CROSS-REFERENCE TO RELATED APPLICATIONS

This application is a continuation-in-part of U.S. patent application Ser. No. 552,030 filed Nov. 15, 1983 by Karel J. Kosman et al., entitled "Fiber Optic Coupling Device Method and System".

BACKGROUND OF THE INVENTION

The present invention pertains generally to communication systems and more particularly to optical communication systems using fiber optic cables.

With the advent of the proliferation of data processing equipment, communications between user devices such as computers and peripherals is of great interest to the computer industry. Modems (modulation/demodulation units) have been universally used in the industry as a means of communicating between user devices. Although standard modem devices are capable of using standard network and telecommunication systems to transmit data, modems suffer from several disadvantages and limitations. For example, data transmission baud rates may be limited to the particular modem utilized. Although baud rates have increased substantially over the past few years, the speed at which data is communicated via modems is slow when compared to other methods of communicating data. This is due, in part, to the limited bandwidth resulting from the frequency at which modems operate. Moreover, the baud rate at which a modem is designed must be matched to the baud rate of the data processing device to which it is communicating. This additionally limits the versatility of such communication systems. Also, modems are subject to electromagnetic interference and radio-frequency interference (EMI/RFI), and eavesdropping and data link taps. Other disadvantages of modems are set forth in U.S. Pat. No. 4,399,563 issued Aug. 16, 1983 to Greenberg.

Other methods of communicating data have been used to overcome disadvantages and limitations of typical modem devices. For example, microwave links have been used to provide high-speed transmission of digital data between user devices. However, microwave links comprise an expensive means of transmitting data and have physical limitations which rule out the use of such systems in many applications.

The use of fiber optic links overcomes many of the disadvantages and limitations of the prior art by providing a means of communicating data optically which is immune to electromagnetic and radio-frequency interference. However, due to the complexity of transmitting data by fiber optic cables, typical prior art systems are extremely complex. Such systems are expensive and have been unable to economically compete with standard modem devices. Typical fiber optic communication systems are disclosed in U.S. Pat. No. 4,381,881 issued May 3, 1983 to Bell; U.S. Pat. No. 4,399,563 issued Aug. 16, 1983 to Greenberg; U.S. Pat. No. 4,366,565 issued Dec. 28, 1982 to Herskowitz; U.S. Pat. No. 4,289,373 issued Sept. 15, 1981 to Sugimoto et al; U.S. Pat. No. 4,362,358 issued Dec. 7, 1982 to Hafle and U.S. Pat. No. 4,341,438 issued July 27, 1982 to Seki et al, which are specifically incorporated herein by reference for all that they disclose.

A significant disadvantage of typical fiber optic data links is the necessity of using two fiber optic cables so that optical data can be transmitted and received simultaneously. Use of two fiber optic cables essentially doubles the cost of the fiber optic data communication line. To overcome these disadvantages and limitations, various coupling devices have been devised for using a single fiber optic cable. For example, Bell discloses an expensive and complex fiber optic cross-bar switch for automatically patching optical signals. The Bell system requires the use of multiple optical detectors and multiple LED's (light emitting diodes). Greenberg discloses a time division multiplexing scheme in which problems due to reflections in a Y-coupler device are eliminated by disabling each receiver when a corresponding transmitter is transmitting data. In a similar manner, Herskowitz uses angular division multiplexing to allow for simultaneous bi-directional transmission of data over a single optic fiber. Sugimoto et al, Hafle and Seki et al all disclose wavelength multiplexing to enable bi-directional transmission of optical data over a single fiber optic cable. Again, such systems require complex multiplexing schemes which are expensive to implement.

SUMMARY OF THE INVENTION

The present invention overcomes the disadvantages and limitations of the prior art by providing a fiber optic coupling device for providing simultaneous bi-directional transmission of optical data over a single fiber optic cable comprising: receive fiber means for receiving optical input signals; transmit fiber means for transmitting optical output signals; combined coupler/connector means for coupling and connecting the receive fiber means and the transmit fiber means with the fiber optic cable to axially and angularly align the receive and transmit fiber means with the cable means to provide simultaneous bi-directional optical coupling of the optical input signals from the link cable to the receive lightguide means, and the optical output signals from the transmit lightguide means to the link cable.

The present invention may also comprise a bi-directional fiber optic communication device comprising fiber optic cable means for bi-directionally communicating optical input signals and optical output signals; transmit fiber means for transmitting the optical output signals; receive fiber means for receiving optical input signals; combined coupler/connector means for axially and angularly aligning the transmit and receive fiber means with the fiber optic cable means to allow simultaneous bi-directional coupling of the optical input and output signals between the transmit and receive fiber means and the fiber optic cable means in the coupler/connector means; receiver assembly means for detecting the optical input signals and producing electrical input signals representative of the optical input signals; transmitter assembly means for producing the optical output signals in response to electrical output signals.

The present invention may also comprise a fiber optic interface device for connecting a plurality of user devices in a communications network comprising line receiver means for receiving electronic data input signals and ready-in-signals from a plurality of user devices; fiber receiver means for receiving input optical data signals and input optical state signals and decoding the input optical data signals to produce a decoded fiber data signal, and decoding the optical data signals and the optical state signals to produce a fiber activity signal; synchronous state means for receiving the ready-in-signals and the fiber activity signal and producing switching signals, ready-out-signals and state signals from a state logic decision table addressed by the ready-in-signals and the fiber activity signal; line driver means for transmitting the ready-out-signals and data-out-signals over an electronic serial data port; fiber transmitter means for transmitting output optical data signals and output optical state signals which are indicative of the operational state of the fiber optic interface device; data steering means for receiving the electronic data signals, the switching signals and the decoded fiber data signal and for selecting a single output signal from the electronic data signals and the decoded fiber data signal in response to the switching signals.

The advantages of the present invention are that it provides an asynchronous data transmission device which is capable of transmitting data at high rates of speed (up to 100 Kbps) with automatic speed selection. Automatic speed selection is also provided by the present invention to eliminate the necessity for matching baud rates between modems and associated user devices. The present invention also provides dual electronic serial data ports so that multiple devices can be connected to a single fiber optic interface device. Transmission of state operational signals over the fiber optic link allows automatic device switching and resource sharing and eliminates the need for mechanical switches. Simultaneous bi-directional transmission of data over a single fiber optic cable is achieved by use of a coupler device which is integrated in a standard fiber optic ferrule connector. The combined coupler/connector is convenient, inexpensive, and provides high optical coupling efficiency. The fiber optic cable is immune to electromagnetic and radio-frequency interference, short circuits, grounding problems and static discharges. The fiber optic cable eliminates environmental safety hazards permitting easy installation and provides data security by protecting information against eavesdropping and data link taps. The system provides a low-loss, high bandwidth communications link which can operate with no external power and can be used in a networking system permitting resource sharing over long distances. Also, the fiber optic cable can be routed with fewer constraints. For example, the cable can be routed within a suspended ceiling with fluorescent lighting and through elevator shafts, and is suitable for noisy environments, such as manufacturing. For additional installation flexibility, the fiber optic interface units can operate either in self-powered mode or be externally powered from the connected devices or by an auxiliary power module.

OBJECTS OF THE INVENTION

It is therefore an object of the present invention to provide an improved fiber optic communications system.

Another object of the present invention is to provide a fiber optic communications system which is easy to maintain and install and is durable.

Another object of the present invention is to provide a fiber optic communications system which permits resource sharing between multiple user devices.

Another object of the present invention is to provide a fiber optic communications system which is capable of high-speed, full-duplex, asynchronous data transmission over a single fiber with automatic speed selection.

Additional objects, advantages and novel features of the invention are set forth in part in the description which follows and will be understood by those skilled in the art on examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings, wherein:

FIG. 12 comprises a schematic diagram of the data steering device.

FIG. 18 is a schematic diagram of the manner in which the fiber optic lightguides are assembled prior to insertion in the ferrule.

FIG. 23 is a top view of the insert device.

FIG. 24 is an end view of the insert device.

FIG. 25 is a side view of the insert device.

FIG. 26 is an exploded view of the components of the receiver assembly.

FIG. 27 is an end view of the PIN diode and receive fibers.

FIG. 28 is a schematic cut-away view of the receiver assembly.

DETAILED DESCRIPTION OF INVENTION

Figure 1:
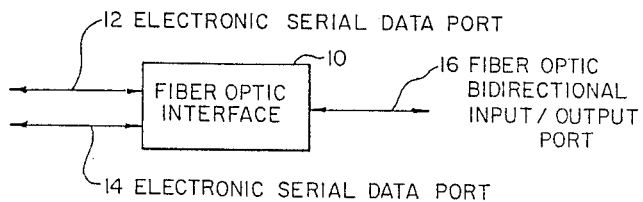
FIG. 1 comprises a schematic block diagram of the fiber optic interface device of the present invention.

FIG. 1 schematically illustrates the fiber optic interface 10 utilized in accordance with the present invention. As shown in FIG. 1, fiber optic interface 10, has two electronic serial data ports 12, 14, which may comprise a standard RS232C compatible, networkable link. The electronic serial data ports 12, 14, are also capable of providing network links via other interfaces including ETA standards RS422, RS423, and RS449 and other electrical interfaces such as coaxial cable interfaces.

Figure 2:
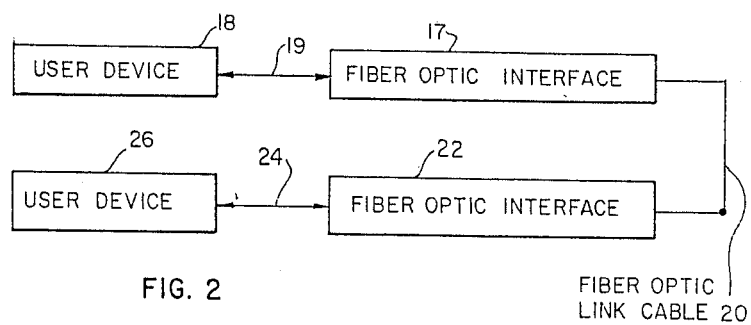
FIG. 2 comprises a typical point-to-point data link.

Fiber optic interface 10 provides an interface device for connecting various devices such as micro-computers, mini-computers, main frame computers, controllers, terminals, peripheral units, and other such devices, via a fiber optic, bi-directional cable, which is immune to electro-magnetic and radio-frequency interference, short circuits, grounding problems and static discharges. Additionally, the fiber optic link provides data security by protecting information against eavesdropping and data link taps. As illustrated in FIG. 1, the fiber optic link cable is coupled to the fiber optic interface 10 at fiber optic bi-directional input/output port 16. Fiber optic interface 10 provides interconnection with other fiber optic interface devices using bi-directional communications over a single, fiber optic cable. Bi-directional communication is accomplished by the use of an asymmetric bi-directional Y-coupler incorporated in a conventional ferrule connector which eliminates the necessity for separate fiber optic transmitter and receiver cables between fiber optic interface devices. Control and monitoring of device connections are accomplished by transmission of state operational signals over the fiber optic link cable 20 (FIG. 2). Dual serial data ports 12, 14 provide for resource sharing, network applications, and daisy-chaining, as illustrated in FIGS. 2 through 4.

FIG. 2 illustrates a typical point-to-point data link between a user device 18 and a user device 26. User devices 18, 26 can comprise data processing units, such as microcomputers, minicomputers, main frame computers, etc. and/or peripheral devices, such as printers, terminals, etc. for connection in various combinations. User device 18 communicates with fiber optic interface 17 via electronic serial data communications link 19. As stated above, electronic serial data link 19 can comprise a standard RS232C transmission link or other suitable means for communicating electronic data in a serial fashion between user device 18 and fiber optic interface 17. Fiber optic interface 17 transforms the electronic serial data produced by user device 18 into optical transmission data, which is transmitted via fiber optic link cable 20. Additionally, fiber optic interface 17 receives optical data transmitted by fiber optic interface 22 and transforms the optical data into electronic serial data having the proper format for communication with user device 18. Fiber optic interface 22, electronic communications data link 24 and user device 26 function in the same manner. They provide a point-to-point, full duplex data communications link between user device 18 and user device 26. Fiber optic interface units 17, 22 utilize a bi-directional fiber optic coupler, described in more detail infra, which allows a single fiber to simultaneously transmit two-way optical information on a single optic fiber. This reduces the cost of the fiber optic communications link by one half over conventional dual fiber optic cable links.

Figure 3:
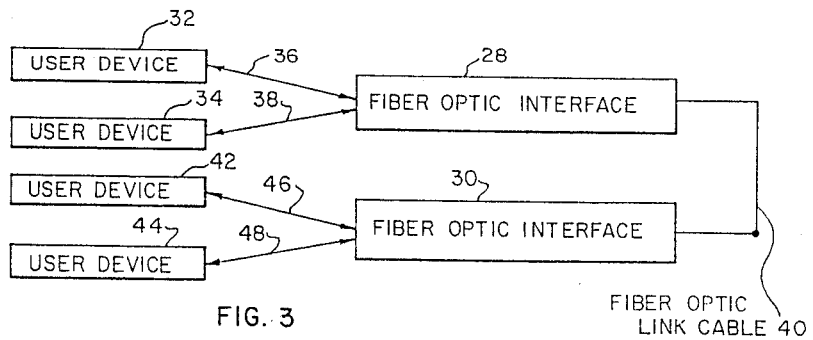
FIG. 3 comprises a schematic block diagram of a multi-point data link.

FIG. 3 is a schematic diagram of a multi-point data link using the fiber optic interface devices of the present invention. As illustrated in FIG. 3, user devices 32, 34 communicate with fiber optic interface device 28 via electronic serial data communication lines 36, 38 which couple to the dual electronic serial data ports provided in fiber optic interface device 28. The fiber optic interface devices 28, 30 are coupled together by a single fiber optic cable 40, in the same manner as disclosed supra. User devices 42, 44 communicate with fiber optic interface 30 by way of electronic serial data communication lines 46, 48 in the same manner as electronic serial data communication lines 36 and 38. Using the fiber optic interface units 28, 30, any pair of the four user devices 32, 34, 42, 44 can inter-communicate at any given time. Other than the two interconnected devices, no other user devices on the network can access the inter-communications thereby assuring the privacy and security of each connection. Control signals generated by the user devices are communicated through the fiber optic interfaces to control access between user devices. Logic circuitry in the fiber optic interface units provides protocol for determining which pair of user devices will be coupled together, in an automatic fashion, and thereby which can eliminate the need for mechanical switching.

Figure 4:
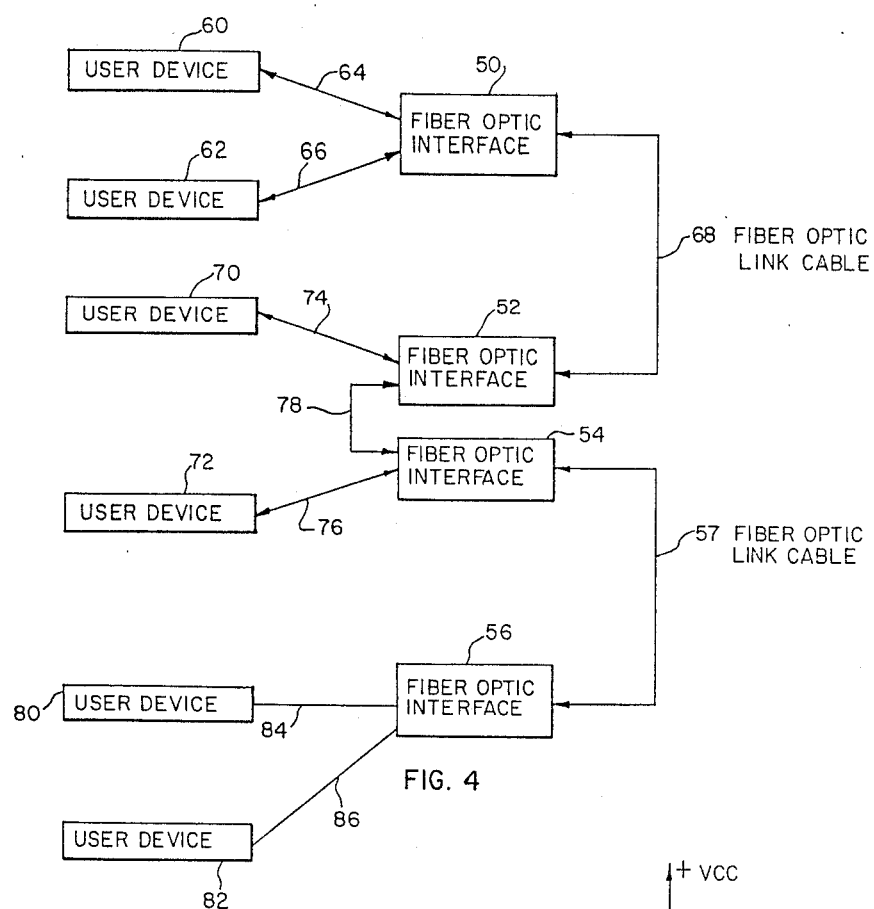
FIG. 4 comprises a schematic block diagram illustrating bridging between fiber optic interface devices.

FIG. 4 is a schematic diagram of the manner in which the fiber optic interface units of the present invention can be coupled together to provide daisy-chaining and bridging. As illustrated in FIG. 4, resource sharing of devices can be accomplished as in FIG. 3 at three or more locations (FIG. 4), while simultaneously allowing the total communications link to be extended to a distance of approximately 10 km. FIG. 4 illustrates two user devices 60, 62 which communicate to fiber optic interface 50 by way of communication lines 64 and 66. At a different location, user devices 70, 72 communicate with fiber optic interface units 52, 54, respectively, via communication link 74, 76. Fiber optic cable 68 provides the communications link between the two locations. Fiber optic interface units 52, 54 are bridged together by the electronic serial data ports of each unit using electronic serial data link 78. Fiber optic interface 54 communicates with fiber optic interface 56 by way of fiber optic cable 57. User devices 80, 82 communicate with fiber optic interface 56 by way of data links 84, 86 in the same manner as fiber optic interface 50. Consequently, each of the user devices 60, 62, 70, 72, 80, 82 can be coupled to another device at one of the three locations to provide network resource sharing between user devices. For example, one or more computers could share the resources of one or more printers at various locations. Again, state signals generated by the user devices are transmitted throughout the network to provide a protocol for the communication links which are established in the network between user devices.

Electronics

Figure 5:
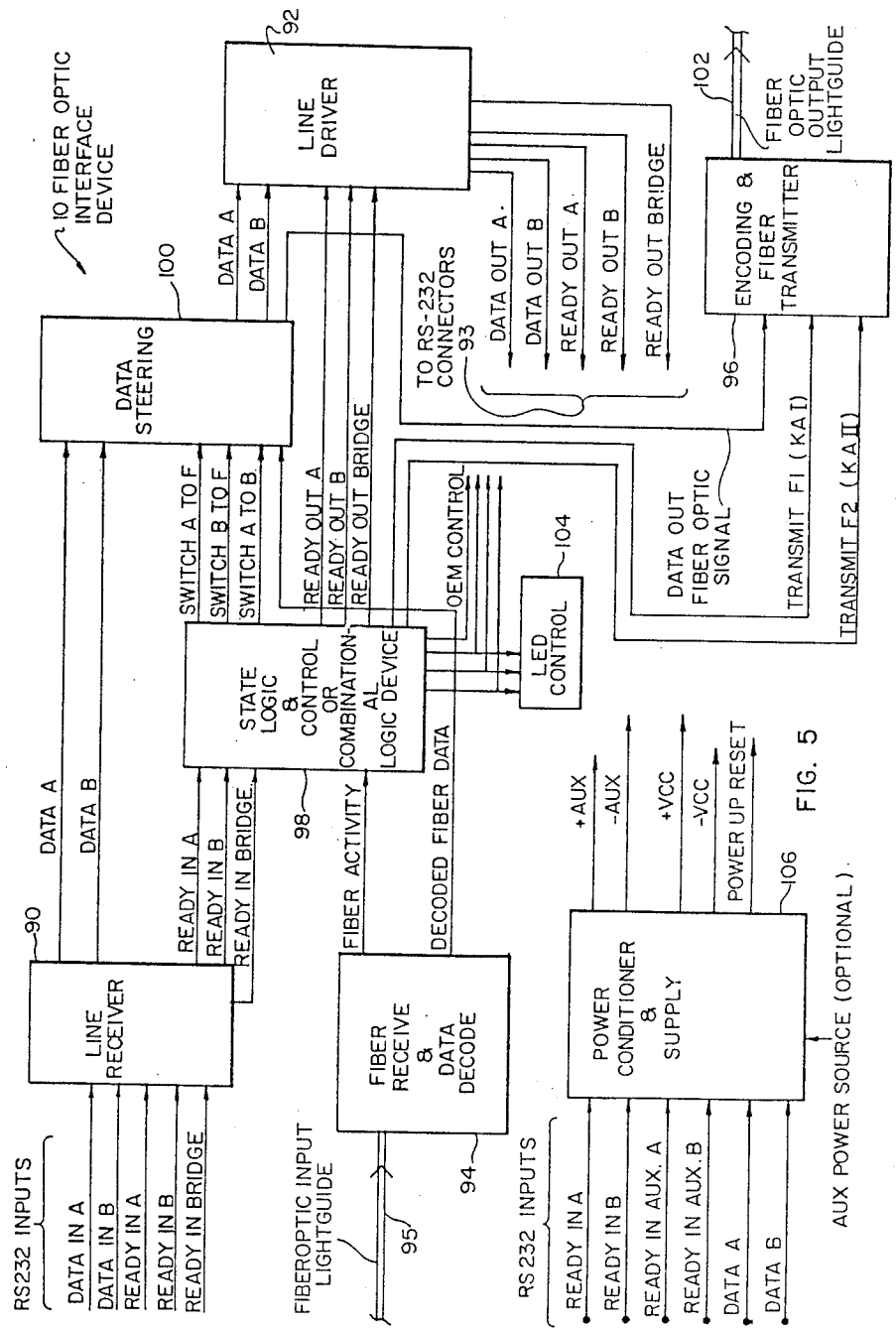
FIG. 5 comprises a schematic block diagram of the fiber optic interface device.

FIG. 5 is a schematic block diagram of the fiber optic interface device of the present invention. As illustrated in FIG. 5, the fiber optic interface device has a line receiver 90 for receiving "data" and "ready" signals via an RS232C port from a user device. Similarly, the fiber optic interface device has a line driver 92 for transmitting data and ready signals via RS232 outputs 93 to the user device. Since each fiber optic interface device has dual electronic serial data ports, such as RS232C ports 93, data and ready signals are indicated by channels A and B. In addition, a "ready-in-bridge" signal is received by line receiver 90 and produced by line driver 92 indicating the ready condition of an additional fiber optic interface device connected in a bridge configuration. The line receiver functions to adjust the electronic serial data input signal levels to levels suitable for use with the CMOS logic circuitry utilized in the fiber optic interface device. In a similar manner, line driver 92 adjusts the CMOS signal levels to RS232 voltage levels.

The fiber receive and data decode device 94 receives fiber optic input signals from fiber optic input lightguides 95, which uses two fibers, and produces a decoded fiber data signal which comprises an electronic serial data signal which has been decoded from the optical signal transmitted over the fiber optic input lightguides 95 using transition decoding. The fiber receive and data decode device also produces a fiber activity signal which indicates the approximate pulse repetition rate of fiber optic signals being received. Three different states can be indicated by the fiber activity signal. A zero state signifies that no activity is occurring over the fiber optic line, indicating a disruption in the fiber optic link. Thus continuity of the fiber optic link is constantly monitored even in the absence of actual transmission of data across the link. A mark 1 state indicates activity on a 40 millisecond basis, and a mark 2 state indicates activity on a 15 millisecond or less basis. The fiber activity signal is directed to state logic and control device 98, while the decoded fiber signal is directed to data steering device 100.

The fiber optic interface device 10 has an encoding and fiber transmitter device 96 which receives a "data out" fiber signal from the data steering device 100 and performs transition encoding for transmission in the proper format over fiber optic output lightguides 102. Transmit F1 and transmit F2 signals produced by data steering device 100 are also received by encoding and fiber transmitter 96 to control the transmission rate of encoding and fiber transmitter 96. The transmit F1 signal indicates a mark 1 transmission interval of 40 milliseconds between pulse, while the transmit F2 signal indicates a transmission interval of mark 2 or data at 15 milliseconds or less between pulses.

State logic and control device 98 receives ready signals from line receiver 90 and a fiber activity signal from fiber receive and data decode device 94. In response to these signals, the state logic and control device 98 utilizes a read-only memory (ROM) look-up table to produce switching signals used by data steering device 100 and "ready out" signals transmitted by line driver 92 to control access between various user devices coupled in a network of fiber optic interface units. The state logic and control device 98 also produces an LED control signal and four OEM control signals which indicate the condition which has been established between fiber optic interface units. The OEM control signals are machine readable signals, while the LED control signal is applied to LED control device 104 which causes an LED to flash at three different rates to indicate the condition of the link. The transmit F1 and F2 signals comprise state operational signals which indicate the state of operation of the fiber optic interface device.

FIG. 5 also discloses power conditioner and supply device 106 which is capable of providing positive and negative voltage sources to power the fiber optic interface device 10 from either an auxiliary power source or from the electronic serial data RS232 inputs. A power-up reset signal is also supplied by the power conditioner and supply device 106 which indicates the availability of power from the power supply circuitry.

Figure 6:
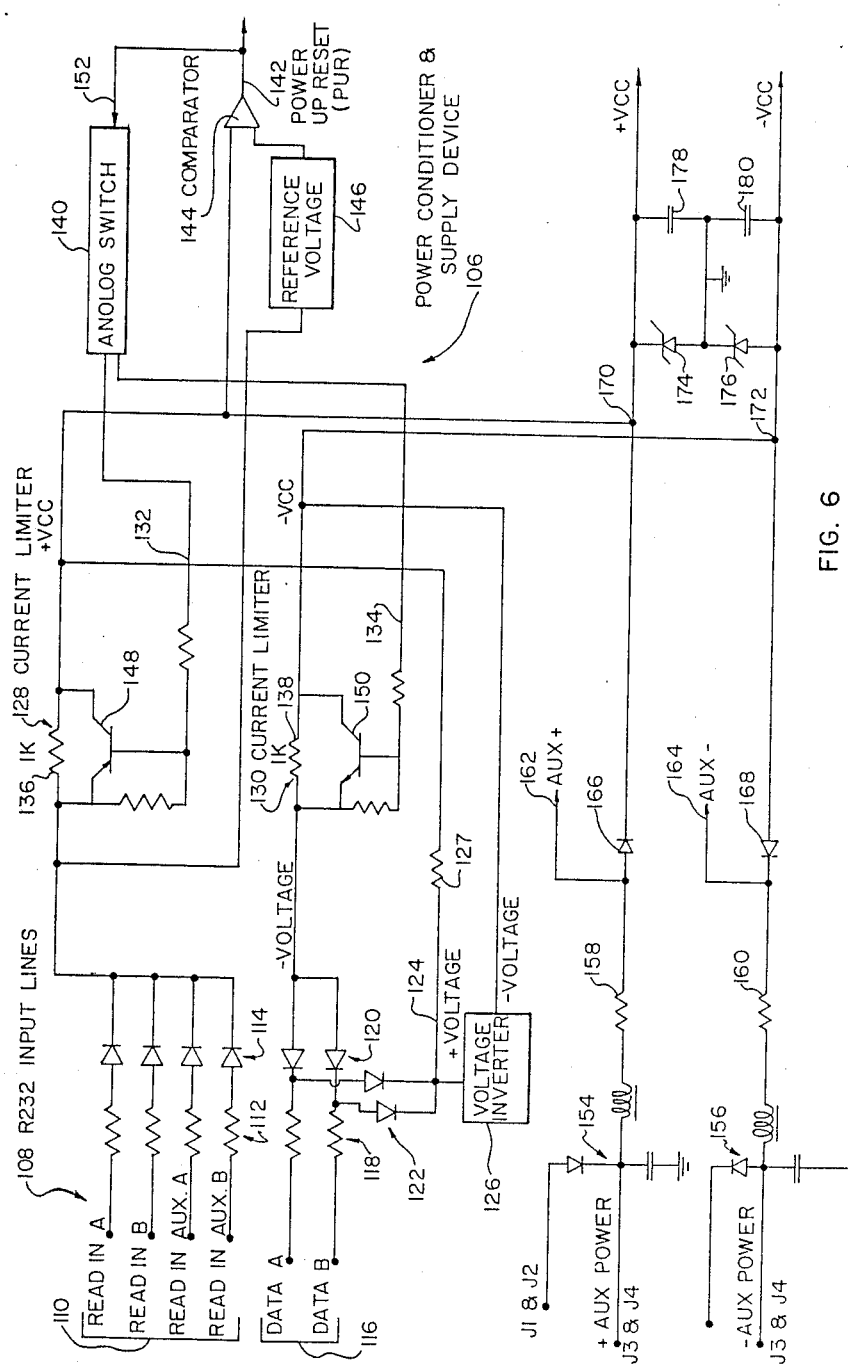
FIG. 6 comprises a schematic diagram of the power conditioner and supply device.

FIG. 6 is a schematic circuit diagram of power conditioner and supply device 106. The power conditioner and supply device 106 is capable of deriving power from the RS232 input lines 108 which comprise the "ready-in-A", "ready-in-B", "ready-in-auxiliary-A", "ready-in-auxiliary-B", "data-in-A" and "data-in-B" lines. These signals are all produced by the user devices. The terminal ready signals 110 are coupled to current limiting resistors 112 and diodes 114 to accumulate positive voltage signals. In a similar manner, data signals 116 are coupled through current limiting resistors 118 and diodes 122 to collect positive voltage signals, and through diodes 120 to accumulate minus voltage signals. Positive voltage signals at the output of diodes 122 are applied via line 124 to the positive voltage signals supplied by the terminal ready signals 110. Isolation resistor 127 isolates the positive voltage signals collected on data terminal line 116 from the positive voltage signals collected from the terminal ready lines 110. Positive voltage at the output of diodes 122 is also applied to voltage inverter 126 which inverts the plus voltage to a minus voltage for application to the minus voltage produced at the output of diode summing circuit 120. Current limiter circuits 128, 130 limit the amount of current supplied by terminal ready lines 110 and data terminal lines 116, respectively, during the power-up phase. Current limiters 128, 130 function to place 1K ohm resistors 136, 138 in series with the positive and negative voltage supply sources during the power-up phase of the fiber optic interface unit. As soon as the power-up phase is over, transistors 148, 150 are driven into saturation by connecting the base terminals to each other by way of analog switch 140, via lines 132, 134. Termination of the power-up phase is indicated by a power-up reset signal 142 produced by comparator 144. The positive voltage level is sampled at the output of current limiter 128 and compared in comparator 144 with a reference voltage produced by voltage generator 146. When the power drain exceeds the capacity of the power supply, causing the positive voltage level to fall below the reference voltage level, the power-up reset level is removed, thereby disabling transmission of fiber optic output data and forcing the unit to standby state. The power-up reset signal is applied to analog switch 140 via conductor 152 to connect conductors 132, 134.

Auxiliary power is available through the J3, J4 pins and unused pins of the RS232 port. LC filtering circuits 154, 156 filter the auxiliary power and protect the remainder of the circuit from transients. Current limiting resistors 158, 160 limit the current of the auxiliary power supply. Conditioned auxiliary power is available to the fiber optic interface device 10 through connections 162, 164. Diodes 166, 168 provide coupling between the auxiliary power source and the power derived from the terminal ready and data input signals. The power derived from the terminal ready and data input signals is combined with the auxiliary power at nodes 170, 172. Zener diodes 174, 176 control the positive and negative supply voltages, while capacitors 178, 180 filter the output voltage signal.

Figure 7:
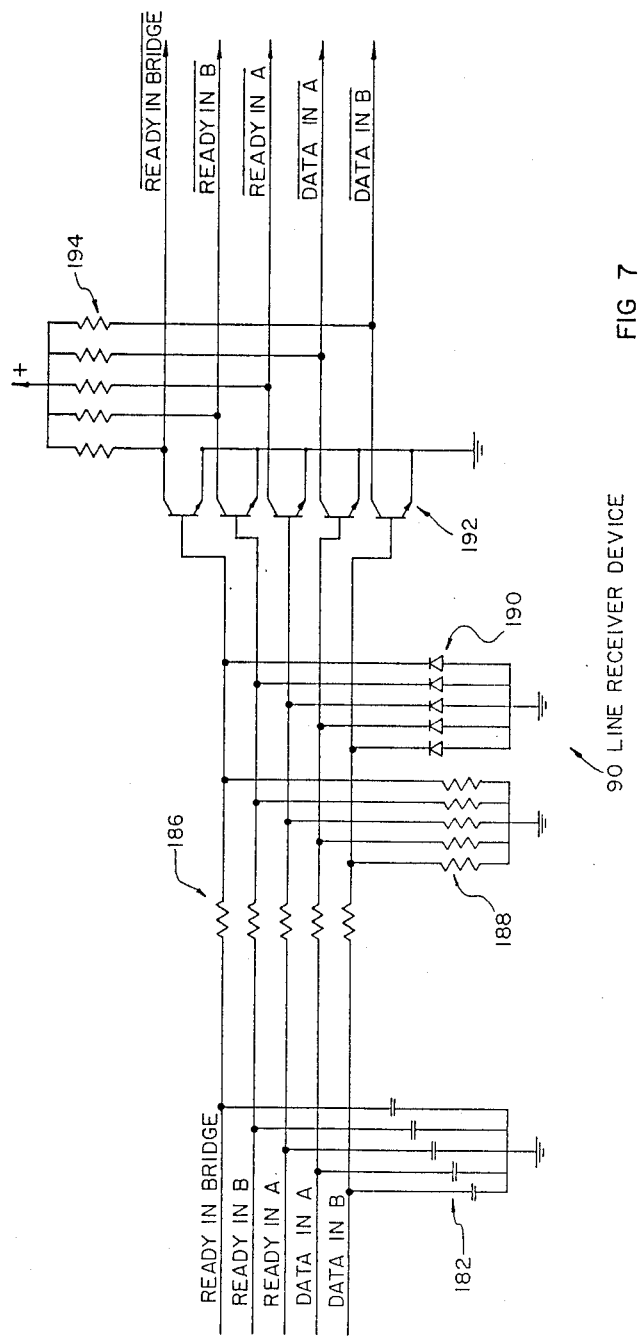
FIG. 7 comprises a schematic diagram of the line receiver device.

FIG. 7 comprises a schematic diagram of line receiver device 90. The line receiver device 90 receives five input signals from a user device via the RS232 input. These five input signals comprise the "ready-in-bridge", "ready-in-B", "ready-in-A", "data-in-A", and "data-in-B" signals. The five input signals to the line receiver device 90 originate from five RS232 inputs provided by the user equipment or a bridged fiber optic interface device 10. Transistor switching network 192 comprises a single common emitter amplifier for each channel of input data. The line receiver functions as a low power RS232 line receiver which detects a "1" as any input greater than approximately 2.1 volts±0.5 volts. Any input less than 0.8 volts±0.5 volts is detected as a "0". These data signals are low-pass filtered by RC filters 182, 186. Resistor network 186, 188 provides a resistive divider network which functions to adjust the voltage of the input signals to appropriate levels to drive transistor switches 192. The voltage at the collectors of 192 is appropriate to interface with CMOS circuitry used throughout the remainder of the device. The circuit is protected against large and negative voltage signals provided on the RS232 input lines by diode network 190. Open collector pull-up resistors 194 provide the bias current for transistor switching network 192.

Figure 8:
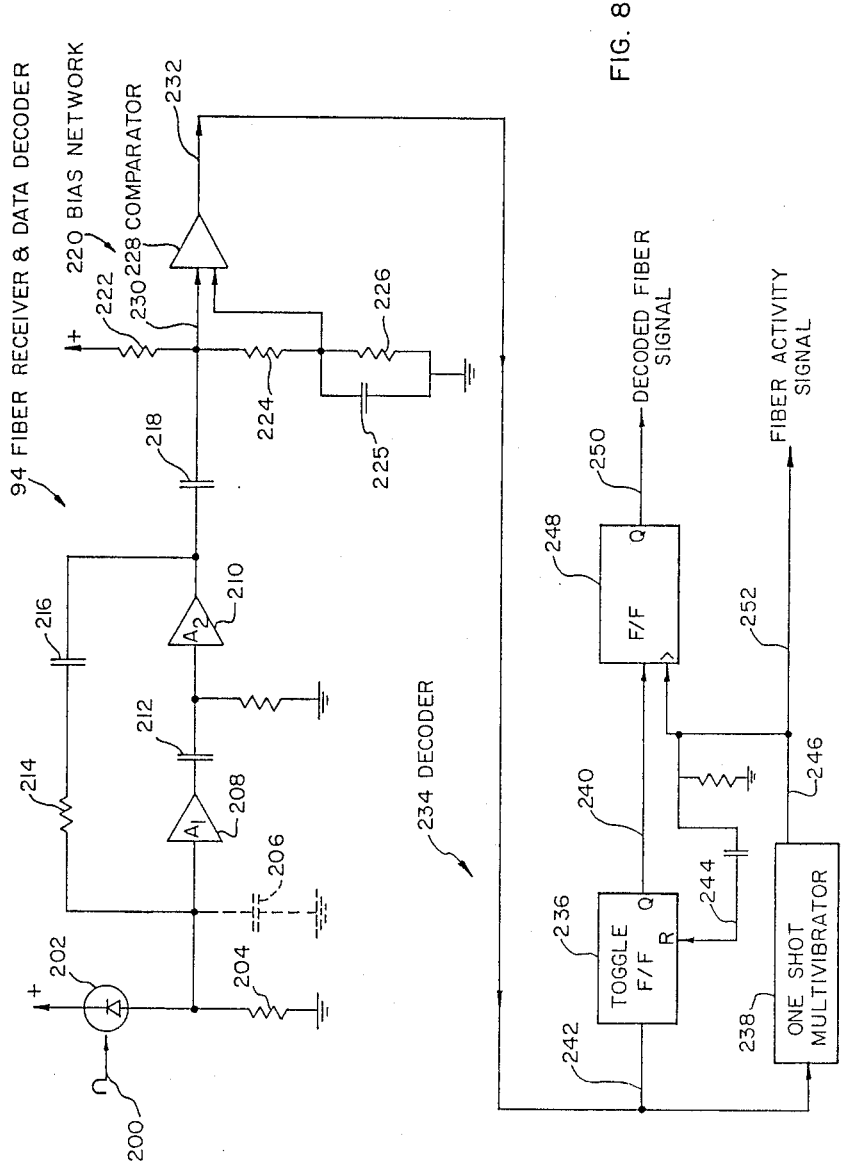
FIG. 8 comprises a schematic diagram of the fiber receiver and data decoder.

The fiber receiver and data decoder 94 is disclosed in FIG. 8. The fiber receiver and data decoder 94 functions to receive an optical signal 200 and discriminate valid optical pulses from reflected pulses. Valid pulses are then decoded to provide CMOS level encoding utilized by the fiber optic interface device 10. An optical pulse 200 representative of a logic 0 is encoded for fiber optic transmission as two 500 nanosecond pulses separated by 1.5 microseconds (a double pulse). A logic 1 is encoded by a single 500 nanosecond pulse. The fiber receive and data decoder 94 decodes the fiber signal to produce a CMOS level 1 when a single pulse is detected and a CMOS level 0 when a double pulse is detected.

Referring to FIG. 8, PIN photo diode 202 receives the optical signal 200 transmitted by the fiber optic link cable and produces an electric pulse signal in response to the optical signal 200. The PIN photo diode 202 is biased with a supply voltage. When an optical signal impinges upon PIN diode 202, current flows causing a voltage to be generated across resistor 204. Stray capacitance 206 limits the response time of the photo diode 202. Since the current level of the PIN photo diode 202 is small, amplifier stages 208, 210 are provided to increase the current pulse level. Amplifier 208 is a unity gain buffer, while amplifier 210 comprises an inverting amplifier having a gain of approximately −6. Capacitor 202 provides AC coupling between amplifier 208 and amplifier 210. Feedback is provided between the output of amplifier 210 and the input of amplifier 208 via resistor 214 and capacitor 216 to improve the pulse response of the fiber receiver. The output of the amplification stages is AC coupled to the remainder of the circuit by capacitor 218. The detected signal is then applied to bias network 220. Resistors 222 and 224 provide a voltage divider network to generate a reference voltage signal across resistor 224. Capacitor 225 ties resistor 224 to AC ground while resistor 226 maintains resistor 224 at a positive DC voltage level.

Resistor 224 establishes the threshold of comparator 228. The selection of the threshold level is critical to the proper operation of the fiber receiver and data decoder 94. The threshold must be chosen such that the largest reflected signal is not detected by the receiver, while the smallest non-reflected signal is detected.

Comparator 228 comprises a low-power, bi-polar comparator which is capable of producing an output signal whenever the threshold level established by resistor 224 is exceeded on data line 230. Comparator output 232 is applied to decoder circuit 234 which differentiates between single pulses and double pulses. Comparator output 232 is applied to the input of toggle flip flop 236 and one-shot multi-vibrator 238. Toggle flip flow 236 changes state at output 240 each time a pulse is applied to input 242. The initial pulse received by toggle flip flop 236 causes the toggle flip flop 236 to change from a 0 state to a 1 state at output 240. If a second pulse is applied to toggle flip flow 236, output 240 changes from a 1 state to a 0 state. One-shot multivibrator 238 produces a pulse at the end of three microseconds from the detection of the first pulse to latch data provided at output 240. Consequently, if only one pulse is received by toggle flip flop 236 during the three microsecond period, output 250 of flip flop 248 will have a 1 output. If two pulses are received by toggle flip flop 236 during the 3 microsecond period, flip flop 248 will be latched with a 0 output. One-shot multivibrator 238 also functions to clear toggle flip flop 236 on reset line 244. Output 250 therefore provides a decoded fiber signal indicating either 0 or 1 states for single or double pulses, respectively. One-shot multivibrator 238 also produces a fiber activity signal 252 indicative of the pulse repetition frequency of data detected by one one-shot multivibrator 238. One-shot multivibrator 238 produces a pulse that occurs each time either a single or a double pulse is detected at the output of comparator 238. The fiber activity signal therefore indicates the rate of occurrence of data provided on the fiber optic input.

Figure 9:
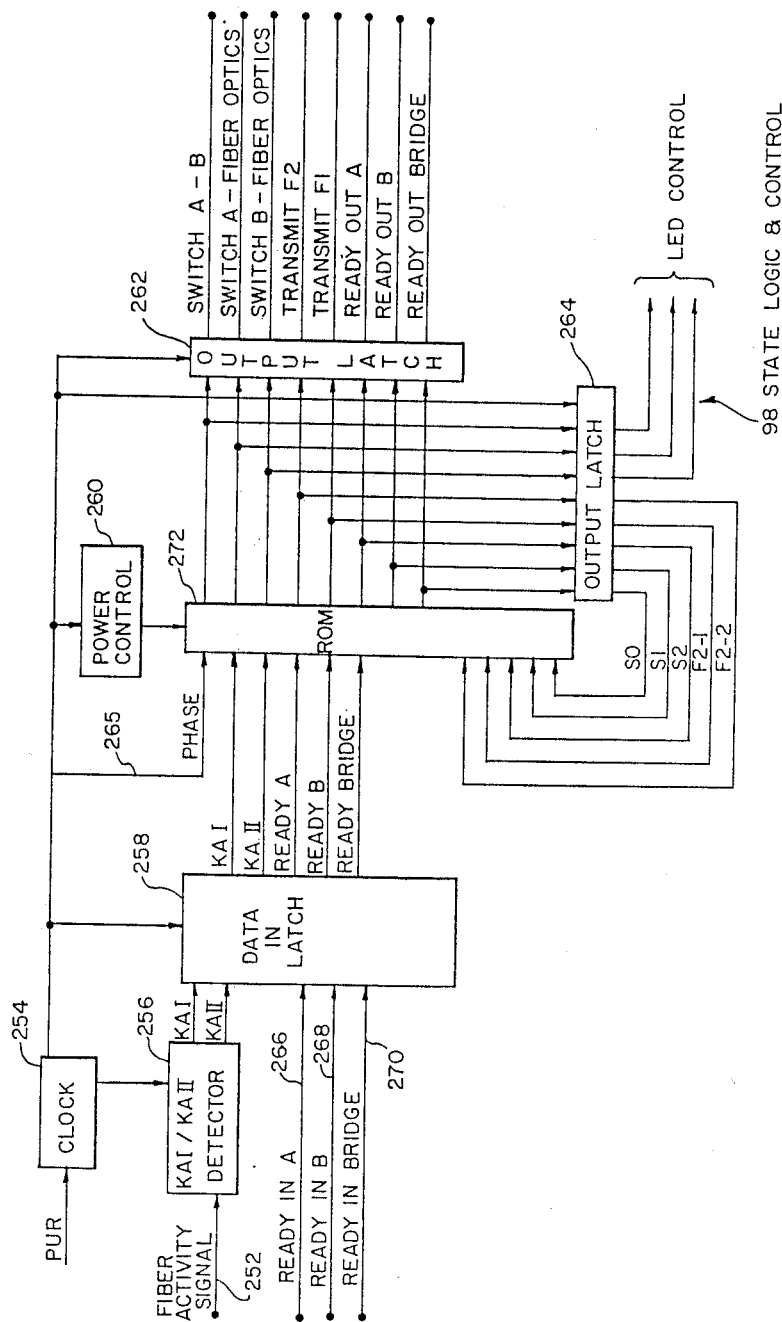
FIG. 9 comprises a schematic block diagram of the state logic and control device.

FIG. 9 is a schematic diagram of state logic and control device 98. State logic and control device 98 comprises a synchronous state device. Clock 254 comprises a 100 hertz clock which generates a clock signal which is applied to KA 1/KA 2 detector 246, data-in-latch 258, power control 260, output latch 262 and output latch 264. Clock 254 comprises an RC oscillator which uses a CMOS timer. Clock 254 synchronizes the entire state logic of state logic and control device 98. Fiber activity signal 252 from one-shot multivibrator 238 of fiber receiver and data decoder 98 (FIG. 8) is applied to the input of KA I/KA II detector 256. At each clock pulse produced by clock 254, detector 256 provides data which is latched in data-in-latch 258 pertaining to the fiber activity state, i.e., either KA I or KA II. Detector 256 distinguishes between 3 types of fiber activity; namely data arriving at the KA I rate (about every 40 ms), data arriving at the KA II rate (about every 15 ms), and no data on the fiber optic cable. A down counter is used to implement the KA I/KA II detector 256. In a similar manner, data-in-latch 258 latches the current state of data from ready-in-A input 266, ready-in-B input 268 and ready-in-bridge input 270.

The five latched signals from data-in-latch 258, comprising the two fiber activity signals (KA I and KA II) and the ready signals (ready-in-A, ready-in-B, and ready-in-bridge), are applied as an address to read-only-memory 272. The additional six address signals are comprised of a phase signal and five feedback signals.

The phase signal addresses the ROM such that 16 output bits are generated from the 8 output bits of the ROM 272. The data contained in ROM 272 comprises a state logical decision table which produces an 8 bit output. Two sets of 8 bit output signals are produced by ROM 262 for each address location in accordance with phase signal 265. When the phase signal 265 is low, output latch 262 is enabled via connector 261 and a first set of 8 bit data is latched into output latch 262. When the phase signal 265 is high, output latch 264 is enabled via connector 263 and a second set of 8 bit data is latched into output latch 264.

Alternatively, the state logic and control device can comprise an asynchronous combinational logic device which can employ LSI technology. Such a device utilizes a series of combinational logic gates and flip flops to produce the switching signals, ready-out signals and fiber optic data transmission rate signals (transmit F1 and transmit F2).

The feedback signal (S0, S1, S2, F2-1, and F2-2) allow outputs to be generated that are a function of past inputs as well as current inputs. The eleven input data is an address of the memory location to be accessed in the read-only-memory. Read-only memory 272 utilizes a 2048 times 8 bit memory.

Power control device 260 applies power to read-only-memory 272 only when access must be made. At other times, ROM 272 is turned off. This provides a power savings of 3 orders of magnitude over a continuous use of the read only memory. In operation, power control device 260 applies power to ROM 272 so that access can be made. The output data is then latched on output latches 262, 264 and power is then removed from ROM 272. Since 16 bits of output data is required, the phase signal 265 causes the ROM 272 to operate in two phases, with 8 bits read from memory during each phase and alternatively applied to output latches 262, 264.

Output latch 262 provides 8 output signals. Three switching signals, i.e., "switch A-B", "switch A-F (fiber optics), and "switch B-F", are applied to data steering device 100. Transmit F1 and transmit F2 signals are applied to encoding and fiber transmitter 96. Transmit F1 and transmit F2 comprise state operational signals indicating the operational state of the fiber optic interface device to cause encoding and fiber transmitter device 96 to generate transmission signals at the KA I or KA II data transmission. Ready-out-A, ready-out-B and ready-out-bridge are applied to line driver 92. The ready-out-A signal is a CMOS signal indicating the ready-out-state of the A port of the fiber optic interface device 10. A ready-out-B indicates the ready-out-state of the B port. The ready-out-bridge signal is a CMOS signal used to control bridging. The switch A-B signal is a CMOS signal used to establish a full duplex data path between ports A and B. The switch A-F signal is a CMOS signal used to establish a full duplex data path between the A port and the fiber optics signal. The switch B-F is a CMOS signal used to establish a full duplex data path between the B port and the fiber optics signal. The transmit F1 and transmit F2 signals are CMOS signals which indicate to the transmitter to re-enforce data at the KA I or KA II rate, respectively.

Output latch 264 produces three LED control signals to indicate the current operational state of the fiber optic interface device 10. Three state bits, S0, S1 and S2 are generated by ROM 272 to keep track of the current state of the state logic and control device. Two additional feedback bits, F2-1 and F2-2, are used to keep track of the fiber activity state (KA I, KA II, or no activity).

The three state bits S0, S1 and S2, together with one LED bit appear on the OEM control signal connector disclosed in FIG. 5.

The three state bits, S0, S1, and S2, encode the eight operational states of the fiber optic interface device. These states are numbered as follows:

| NUMBER | STATE |
|---|---|
| 0 | Stand-by |
| 1 | Active |
| 2 | Bridging Active A |
| 3 | Connect A-to-B |
| 4 | Link A |
| 5 | Connect F to A |
| 6 | Link B |
| 7 | Connect F to B |

The fiber optic interface unit can assume one of eight states of operation, determined by the status and history of the ready-in-A, ready-in-B, ready-in-bridge and fiber optic link signals. In the standby state, the unit is powered but all ready-in (A, B, bridge) signals are off and no signal is being received by the fiber. In the active state, three conditions exist; active A, active B and active F. In these states, the unit is powered and one ready-in (A, B, bridge, or F signal) is on. In the linking state, two linking conditions exist; linking A and linking B. In these states, the unit is powered on, a ready-in signal is received and an active fiber signal is received. The fiber optic interface device 10 has not yet received acknowledgement of an end to end connection. The bridge-active-A state occurs only when units are bridged. In this state, the A port is ready and the bridge signal from the other unit is active. In the connected state, three connected conditions exist; connected A-B, connected A-F (fiber-optics), and connected B-F (fiber-optics).

The following table summarizes the state of the fiber optic interface device 10 and the inputs and outputs associated with each piece therein.

| State | Ready In | | | | Ready Out | | | Data Out | | | |
|---|---|---|---|---|---|---|---|---|---|---|---|
| | F | B | BR | A | B | BR | A | F | B | A | LED |
| Standby | 0 | 0 | 0 | 0 | 0 | 0 | 0 | MK1 | A | B | OFF |
| Active A | 0 | 0 | 0 | 1 | 0 | 1 | 0 | MK1 | A | B | OFF |
| Active B | 0 | 1 | d | 0 | 0 | 0 | 0 | MK1 | A | B | OFF |
| | 0 | 0 | 1 | 0 | 0 | 0 | 0 | MK1 | A | B | OFF |
| Active F | 1 | 0 | 0 | 0 | 0 | 1 | 0 | A+B | A+F | B+F | FST |
| | 2 | 0 | 0 | 0 | 0 | 1 | 0 | A+B | A+F | B+F | ON |
| BRG Act A | 1 | 0 | 1 | 1 | 1 | 1 | 0 | A+B | A+F | B+F | ON |
| | 0 | 0 | 1 | 1 | 1 | 1 | 0 | MK1 | A | B | OFF |
| Linking F-A | 1 | d | d | 1 | 0 | 1 | 0 | A+B | A+F | B+F | ON |
| Linking F-B | 1 | 1 | d | d | 0 | 1 | 0 | A+B | A+F | B+F | ON |
| | 1 | 0 | 1 | d | 0 | 1 | 0 | A+B | A+F | B+F | FST |
| | 2 | 0 | 1 | d | 1 | 1 | 0 | A+B | A+F | B+F | ON |
| Connected A-B | d | 1 | d | 1 | 1 | 1 | 1 | MK1 | A | B | SLW |
| Connected F-A | 2 | d | d | 1 | 0 | 0 | 1 | A | MK | F | SLW |

-continued

| State | Ready In | | | | Ready Out | | | Data Out | | | |
|---|---|---|---|---|---|---|---|---|---|---|---|
| | F | B | BR | A | B | BR | A | F | B | A | LED |
| Connected F-B | 2 | 1 | d | d | 1 | 1 | 0 | B | F | MK | SLW |

Inputs:
d - don't care
IN F=0 - no signal in last 150 millisec;
IN F=1 - reception spaced by 30 to 150 ms.
IN F=2 - reception spaced by less than 30 ms.
Outputs:
A - The data input on Part A will be signalled over the indicated output port
B - The data input on Port B will be signalled over the indicated output port
F - The data input on Port F will be signalled over the indicated output port
A+B - The signal "OR" of the date input on port A and B will be signalled over the fiber port
A+F - The logical "OR" of the data input on port A and F will be signalled over the B port
B+F - The logical "OR" of the data input on port B and F will be signalled over the A port
MK1 - A logical 0 is sent over fiber at the KA I rate
LED:
ON - Flash 100 times/sec (appears on steady)
FST - Flash 10 times/sec
SLW - Flash 1 time/sec
MK - A logical 0 sent over RS-212 interface Notice from the preceding table that two distinct operational modes exist for the fiber optic interface device 10. The device will operate in a secure full duplex mode with any two devices on a network able to communicate at any time. It will also operate in a broadcast mode with one device talking and the remaining device listening.

When operating for secure full duplex operation the device establishes a connection between the first two devices connected to a network that request a connection. In secure full duplex only the two connected devices user devices receive data. Devices request a connection by setting a ready-in lead high. The device 10 uses the LED status indicator to inform the user about the status of other devices on the network, as well as about the status of the fiber linking a device with its neighbor. In the case that two devices request a connection to a third previously ready resource, the following convention is used to resolve contention:

Case (1) A Remote device is ready, and both A and B request service simultaneously: Device B is connected to the remote device;

Case (2) A is ready, and both B and a remote device request service simultaneously: Device B is connected to device A;

Case (3) B is ready, and both A and a remote device request service simultaneously: Device A is connected to device B;

Case (4) Device A or B is ready, and two remote devices, one on either side of this node request service simultaneously: the remote device closest to this node will be connected to device A or B. (Closest is used here to to mean least number of intervening nodes.);

Case (5) Device A or B is ready, and two remote devices, both on the same side of this node request service simultaneously: the connection can not be predicted; either the device closes to this node will be connected to device A or B, or the two devices requesting service will be connected to each other (established in the state logic control).

Operating in the broadcast mode can be performed when no devices attached to the network have activated Ready-In, or when the transmitting device has activated Ready-In. All devices but the transmitting device must have Data-In at "mark" (logical 0). Any data sent by the transmitting device is received at all other ports on the network. Broadcast operation will not work if more than one device transmits (has Data-In not at "mark") at any time or if any non-transmitting device has an active Ready-In.

An alternative embodiment employs a board version which is intended for installation into a host product. The board version has a single connector providing the electrical interface. Using wiring options, the user may configure the board version to work in several different operational modes. The two ports of the board version are designated A and B. The A port is a TTL level port. (TTL is an electrical interface standard typified by 0 to 0.8 volts as a "0" and 2.1 to +5 volts as a "1".) The B port, which is also used for daisy-chaining units together, may be configured as an RS-232 port or as a bridge-only port. (RS-232 is an electrical interface standard typified by −3 to −15 volts as a "off" or "mark" and +3 to +15 volts as an "on" or "space".)

Two options are available for powering the board version: with a +5 and +/−12 V supply, or with a +5 and +12 V supply. The +5, +/−12 V supply allows TTL operation of the A port and RS-232 operation of the B port. The +5 and +12 V option allows only the TTL operation of the A port (RS-232 operation of the B port is not supported, but the B port can still be used as a bridge).

The following table identifies each I/D signal, its pin, and the signal name for the board version:

| Type | Pin | Signal Name |
|---|---|---|
| TTL | 16 | Data in A |
| TTL | 18 | Ready in A |
| TTL | 11 | Data out A |
| TTL | 14 | Ready out A |
| RS-232 | 2 | Data in B |
| RS-232 | 3 | Ready in B |
| RS-232 | 12 | Ready in bridge |
| RS-232 | 1 | Data out B |
| RS-232 | 3 | Ready out B |
| RS-232 | 17 | Ready out bridge |
| TTL | 9 | State-0 |
| TTL | 10 | State-1 |
| TTL | 8 | State-2 |
| TTL | 6 | State-3 |
| Power | 19 | Ground |
| Power | 5 | PWR+In |
| Power | 20 | PWR−In |
| Power | 15 | +5 V |
| Power | 7 | PwrProg1/Ground |
| Power | 13 | PwrProg2 |

Two options are available for PWR-In:

RS-232 Operation

The PWR-IN input must be less than −10 V and greater than −15 V referenced to ground. (typically −12 V with less than 2 V ripple). Zener shunt regulation is used so if the input voltage increases the required current will also increase. At −10 V input 20 mA is required, at −12 V input, 45 mA is required and at −15 V input 100 mA is required.

TTL Only Operation

The PWR-In input is connected to ground, and pins 7 and 13 are connected together.

The selection of the power options, e.g. TTL only operations or RS-232 operation, is made with two power option programming pins. These pins are used to select the minus voltage powering option.

Minus Voltage Operation:
  Pins 7 and 19 are connected to ground
  Pin 13 is left open
Plus Voltage Only Operation:
  Pin 19 is connected to ground
  Pins 7 and 13 are connected together, but not to anything else.

Four signals are available to the user which completely describe the state of operation of the board version. These indicators State-3, State-2, State-1, and State-0 make up a 4-bit code. State-3 is the most significant bit, and State-0 is the least significant bit.

The codes are defined as follows:

| Code | State | Operational States Meaning |
|---|---|---|
| 0 | Standby | No Fiber Signal Received, No Ready Inputs |
| 1 | Active | If No Ready Inputs - KA I on fiber if one Ready Input - no fiber signal |
| 2 | Bridge Act A | No Fiber Input, Ready-In-Bridge and Ready-In-A high |
| 3 | Connect A-B | Connection between A and B ports |
| 4 | | Not Used |
| 5 | Connect A-F | Connection between A and F ports |
| 6 | Link B | Ready-In-Bridge high and KA I on fiber |
| 7 | Connect B-F | Connection between B and F ports |
| 8 | | Not Used |
| 9 | Active | No Ready Inputs, KA II on fiber |
| 10 | Bridge Act A | KA I on fiber, Ready-in-Bridge and Ready-In-A high |
| 11 | | Not Used |
| 12 | Link A | Ready-In-A high and KA I on fiber |
| 13 | | Not Used |
| 14 | Link B | Ready-In Bridge high and KA I on fiber |
| 15 | | Not Used |

Figure 10:
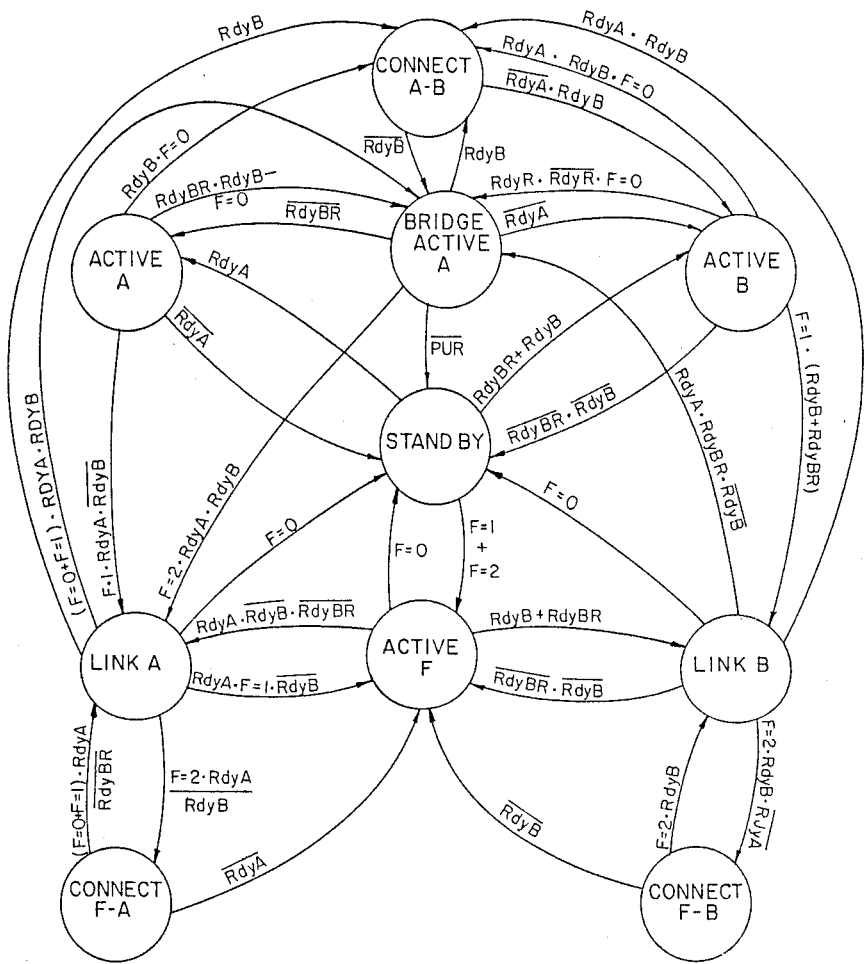
FIG. 10 comprises a state diagram.

FIG. 10 comprises an operational state diagram of the operation of the present invention which complements the above table to fully describe the operation of the synchronous state machine.

Figure 11:
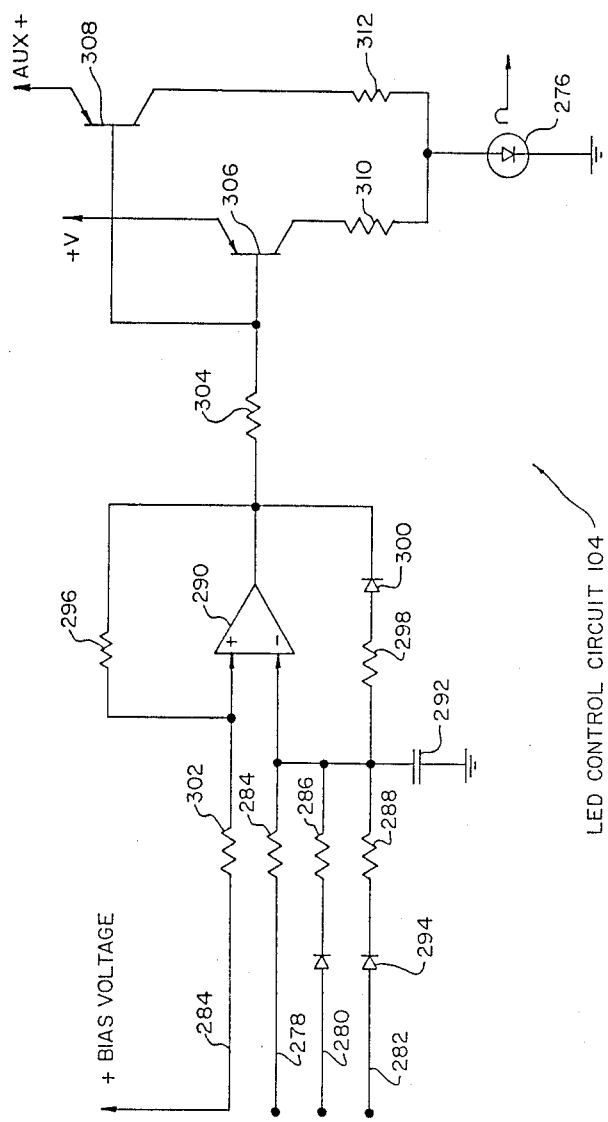
FIG. 11 comprises a schematic diagram of the LED control circuit.

FIG. 11 comprises a schematic diagram of the LED control device of the present invention. The LED control circuit 104 drives a diagnostic, light emitting diode (LED) which is visible to the user at one of three flash rates to indicate the current state of the fiber optic interface device 10. A slow flash of about 1 flash per second indicates an end to end connection has been established with a user device coupled to another fiber optic interface unit. A fast flash, of about 10 flashes per second, indicates a fiber link is in place between connected fiber optic interface units. A flash rate of 100 flashes per second which appears to the user as a steady "ON" signal indicates a common resource is available on the network. LED "off" indicates interruption in the fiber link between two interface devices 10 or it represents that the interface devices are off (not powered).

State logic and control device 98 produces three LED control signals 278, 280, and 282. These control signals are applied to a RC oscillator which utilizes a comparator device 290. The oscillator circuit is capable of producing three flash rates, dependent upon the RC time constant of resistors 284, 286, 288, and capactiro 292. For example, the RC time constant of resistor 284 and capacitor 292 is different from the RC time constant of resistor 288 and capacitor 292. Consequently, different oscillation rates can be produced by applying inputs to the various control lines 278, 280, and 282. Diodes 294 provide protection from the reverse flow of current, whenever lines 280, 282 are not activated. Feedback resistors 296, 298 provide the appropriate feedback to produce oscillation. A bias voltage is provided on line 284 to resistor 302. Base resistor 304 limits the current to the base of transistors 306 and 308.

The LED control can operate the LED at two different brightness levels depending upon whether external auxiliary power is available. If auxiliary power is available current passes through both transistors 306 and 308 to provide more current to LED 276. If auxiliary power is not available, only transistor 306 conducts at a much lower current level, so that LED 276 has a much lower brightness level. Both transistors 306 and 308 are driven to saturation when the voltage level goes low at base resistor 304 assuming V+ power and Aux+ power are available.

FIG. 12 is a schematic diagram of data steering device 100. Switching signals from state logic and control device 98 are applied to the data steering device 100 to control the data channel to be transmitted over line driver 92 and encoding and fiber transmitter 96. The switching control signals comprise switch A-F, switch B-F, switch A-B. As illustrated in FIG. 12, the three switching control signals are applied to the data steering device 100 in conjunction with the data-in-A, data-in-B, and data-in-F signals. The data signals and switching control signals are applied to six AND gates 314, 316, 318, 320, 322, and 324. The output of the AND gates is applied to OR gates 326, 328, and 330 to produce either a data-out-A, data-out-B, or fiber-data-out signal. The switching control signals function to select the data channel which is to be activated at the output of the full duplex data steering device 100. For example, when switch A-B is active, data-in-A is connected to data-out-B and data-in-B is connected to data-out-A. The data-out-A and data-out-B channels are applied to line driver 92, while the data-out-F signal is applied to encoding and fiber transmitter 96 for transmission over fiber optic output cable (transmit lightguide) 102.

Figure 13:
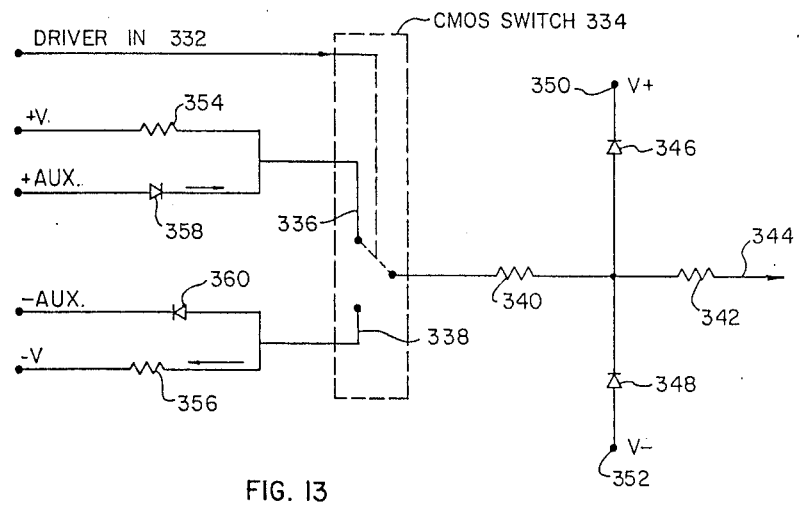
FIG. 13 comprises a schematic diagram of the line driver.

FIG. 13 illustrates one channel of line driver 92. Line driver 92 generates five RS232outputs from five CMOS inputs. The five CMOS inputs comprise data-out-A, data-out-B, ready-out A, ready-out B, and ready-out bridge signals. Each signal is applied to a separate channel, such as the channel illustrated in FIG. 13. The data and ready signals are applied to the driver-in line 332 to operate CMOS switch 334. A high level on driver input 332 causes CMOS switch 334 to be coupled to positive voltage supply 336 in the manner illustrated in FIG. 13, while a low level causes CMOS switch 334 to couple to a negative voltage supply 338. The voltage levels provided by positive voltage supply 336 and negative voltage supply 338 cause current to flow through current-limiting resistors 340 and 342 to produce RS232 voltage levels and impedances at output 344. The voltage supply sources provided at 336, 338 are capable of providing the drive capability necessary for RS232 communications. Diodes 346, 348 provide protection from the presence of voltage levels at output 344.

The line driver circuit 92 has the ability to operate with two different source impedances depending upon the availability of external auxiliary power. If external auxiliary power is available, the output source impedance is approximately 1.4K ohms. Without external auxiliary power, the output source impedance increases to approximately 3.2K ohms as a result of resistors 354, 356. Diodes 358, 360 isolate the auxiliary power supply when auxiliary voltages are not available. The change of impedance limits the amount of power that is supplied to all of the RS232 outputs when external power is not available.

Figure 14:
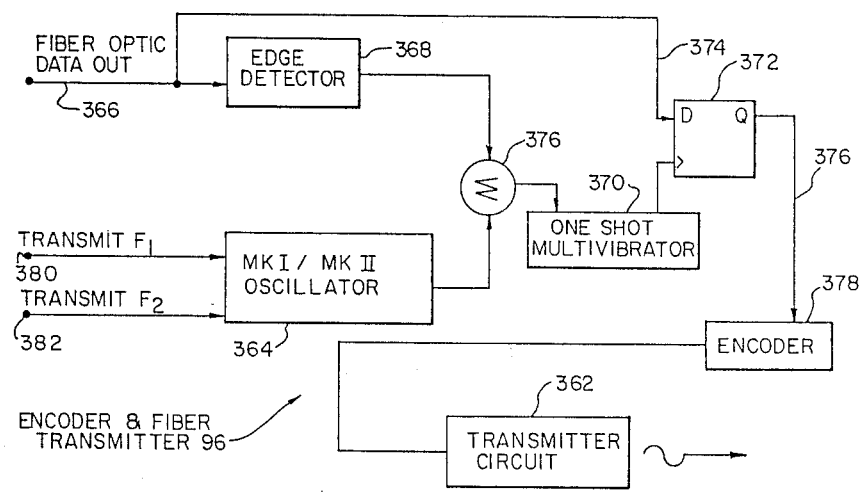
FIG. 14 comprises a schematic block diagram of the encoder and fiber transmitter.

FIG. 14 schematically illustrates the encoding and fiber transmitter 96. The encoding and fiber transmitter device uses transition encoding to encode CMOS logic signals produced by the fiber optic interface device 10 into a transition code which is transmitted by transmitter circuit 362. In the event no new data is available, marking signals are sent down the fiber optic cable in response to pulses produced by mark 1/mark 2 oscillator 364. Fiber optic data signals are received from data steering device 100 and are applied to input 366 of encoder and fiber transmitter 96. The fiber optic data signals are applied to edge detector 368 and latch 372. Edge detector 368 produces a pulse for data transitions from either positive to negative or negative to positive. Each pulse from the edge detector 368 fires one-shot multivibrator 370 which produces a pulse lasting for 6 microseconds. At the end of the 6 microsecond period, latch 372 latches the data at input 374 which produces a corresponding output at output 376 which comprises either a low or high signal indicating a logic 1 or 0. The logic 1 or 0 is then encoded as either a single pulse for a logic 1 or a double pulse for a logic 0. The encoded signal is then sent to transmitter circuit 362 for transmission over the fiber optic cable. The function of the one-shot multivibrator is to ensure that pulses do not occur at a rate faster than 6 microseconds. Since the edge detector fires on both positive to negative and negative to positive transitions, one-shot multivibrator causes both logic 1 and logic 0 levels to be latched in latch 372. The mark 1/mark 2 oscillator 364 runs at a selected rate determined by the transmit F1 signal at input 380 or the transmit F2 signal at input 382. Summing circuit transmits the mark 1/mark 2 oscillator signal and changes in data levels are occurring at input 366 to 370. The transmit F1 and transmit F2 signals are generated by the state logic and control device 98 which determines the pulse repetition rate of the idling pulses to be transmitted by transmitter circuit 362. This means that if no activity is on fiber optic data out 366, the last level is repeated at the mark 1 or mark 2 rate.

Figure 15:
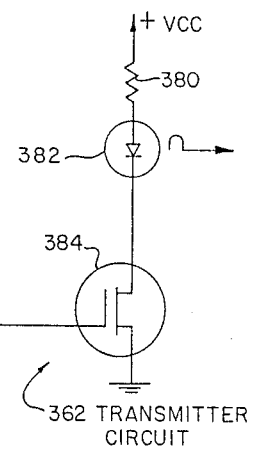
FIG. 15 comprises a schematic diagram of the transmitter circuit.

FIG. 15 comprises a schematic diagram of transmitter circuit 362. FIG. 15 comprises a schematic illustration of transmitter circuit 362. The encoded fiber optic signal is received from the encoded fiber transmitter circuit and applied to the gate of a field effect transistor 384. Current limiting resistor 380 is connected between a voltage source and an infrared LED 382. Encoded pulses at input 386 cause field effect transistor 384 to conduct causing current to flow through LED 382 to produce illumination.

Fiber Optics

The present invention uses functionally integrated, reconfigurable, fiber optic assemblies which allow key fiber optic functions to be efficiently integrated. Typical prior art fiber optic interconnect systems utilize many types of active (electro-optical) and passive (optical) components. Active components include transmitters, capable of emitting modulated light, and receivers capable of detecting light. Passive components are used to guide, couple and direct light, and such components include optical fibers (cables), connectors and couplers. Connectors provide a means for connecting and disconnecting fiber optic cables from other active or passive components and can employ commercially available connector devices such as ferrules. Couplers function to couple light from active or passive components to other active or passive components.

The number of passive components in a transmission path has direct bearing on the losses of light caused by optical discontinuities (e.g., glass/air interfaces), divergence and absorption of light, and mechanical misalignment. The fewer the number of discrete components used in a system, the lower the systems losses, complexity and cost.

Physical integration of the following functions, in accordance with the present invention, decreases the number of discrete components, and consequently reduces systems losses, complexity and cost. Accordingly, the present invention uses a sub-assembly device employing a combination coupler/connector which can integrate the following functions:

1. Launching: The injection of emitted light from a transmitter onto one of several fibers.
2. Reception: The routing of light onto a detector.
3. Splitting: The branching of transmitted light into several directions.
4. Joining: The merging of several light transmission paths into a single transmission path.
5. Reconfiguration: The altering of a transmission path, either abruptly, e.g., by connecting or disconnecting, or gradually, e.g., by adjustment.
6. Feedback: The looping back of a portion of transmitted light for monitoring, self-alignment, or self-test. The feedback function is often associated with the reconfiguration function.

To effect the desired functions in accordance with the present invention, fibers and groups of fibers are positioned against each other and against active components so that light is appropriately guided through the fibers and transformed between other fibers and the active components. Relative movement of such fibers and groups of fibers provides for reconfigurability. Light is transferred between fibers by aligning and abutting ends of the fibers with one another. The gap between the facing fiber ends may be filled with air, a recladding material, a refractive index matching material, an optical material, or a combination of such materials. Spaces between fibers in a parallel group may be filled with a recladding material or a mode stripping material.

In general, the manner of implementation of the various functions recited above are described, in general, below.

The function of launching is accomplished by positioning the faces of one or several fibers against a transmitter. Light emitting diodes (LED's) having a suitable wavelength (e.g., 280 nanometers), are suitable for use as transmitters due to the ability of the optic fibers to transmit light with high efficiency at such IR frequencies. Of these, micro-lensed devices which incorporate an optical focusing sphere have been found particularly effective for launching light in fiber optics. Both windowed (hermetically sealed) or windowless active devices may be used. Exposed fiber ends are surrounded by a recladding material and aligned for the desired amount of light to be launched.

The reception function is implemented by positioning one or more fiber ends in facing alignment with a detector which can comprise a PIN photo diode. The space between the fibers and the photo detectors is filled with an index matching material and a conformal material if the detector chip is exposed.

The splitting function is performed by positioning a fiber, or group of fibers, against at least two other fibers so that any light emitted from the fiber or first group of fibers split among the other fibers. Various splitting ratios can be achieved by utilizing fibers of different diameters and varying position.

The joining function comprises the reverse function of the splitting function, whereby light from more than one fiber is directed onto another fiber, or another group of fibers.

The reconfiguration function is accomplished by altering the relative positions between groups of fibers or between fibers in active components to change the pattern of light transferred between groups of fibers or between fibers and active components. The change can be either binary, i.e., on or off, or continuous, e.g., over a range of splitting ratios. The change can be introduced manually, e.g., on mating a connector, or automatically, e.g., by an electric actuator.

The feedback function is accomplished by splitting a portion of a transmitted signal so that one output fiber is connected to a local receiver.

The single fiber optic link cable is used to communicate bi-directionally between a plurality of fiber optic interface units 10. As illustrated in FIG. 5, each fiber optic interface device 10 has fiber optic input lightguides 95 and a fiber optic output lightguide 102. In order for data to be transmitted on a single fiber optic cable, fiber optic input lightguides 95 and fiber optic output lightguide 102 must be coupled to a single fiber optic link cable. The present invention combines an asymmetric bi-directional Y-coupler device with a commercially available fiber optic connector ferrule, in a single device, to reduce attenuation due to lightguide coupling and reflection. Reflections at the combined coupler-connector interface are reduced in accordance with the present invention by means of recladding and/or mode stripping media which surround the individual glass fibers, and by precise longitudinal spacing providing a predetermined separation gap between the ends of the fibers and which is established by relative position of the fiber optic interface device ferrule and the single fiber optic link cable ferrule. The individual glass fibers can be glass fibers with soft cladding stripped therefrom, glass fibers with hard cladding intact, or a combination thereof. When a group of fiber lightguides is assembled in a coupler, such as in the asymmetric bi-directional coupler/connector of the present invention, a value known as the packing ratio is used to define the coupler's effectiveness. This is the ratio of the light accepting or transmitting areas of the cores, at the face of the coupler, to the overall area onto which light may fall or be transmitted. The more spacing between the adjacent cores, the lower the packing ratio and the relatively lesser portion of light guided into the cores. For best packing efficiency, a tight alignment of lightguide cores, stripped of all cladding, would be desirable. Such close contact, however, would lead to a leakage of light between the cores resulting in excessive reflection into the input lightguides. It has been determined that for optimum results the cores should be separated by cladding having a thickness of between 4 to 15%, and at any rate no more of 30%, of the core diameter.

Another important consideration is the spacing between the faces of the coupler, i.e. the longitudinal separation of the lightguides and link cable. The designed spacing is related to the geometry of the gap and diameter of the fibers. With tight spacing, much of the reflection falls back on the output lightguide from where it was transmitted. As the gap increases, some reflected light reaches the input lightguides where it can be ultimately confused for an incoming transmission over the link cable.

Figure 19:
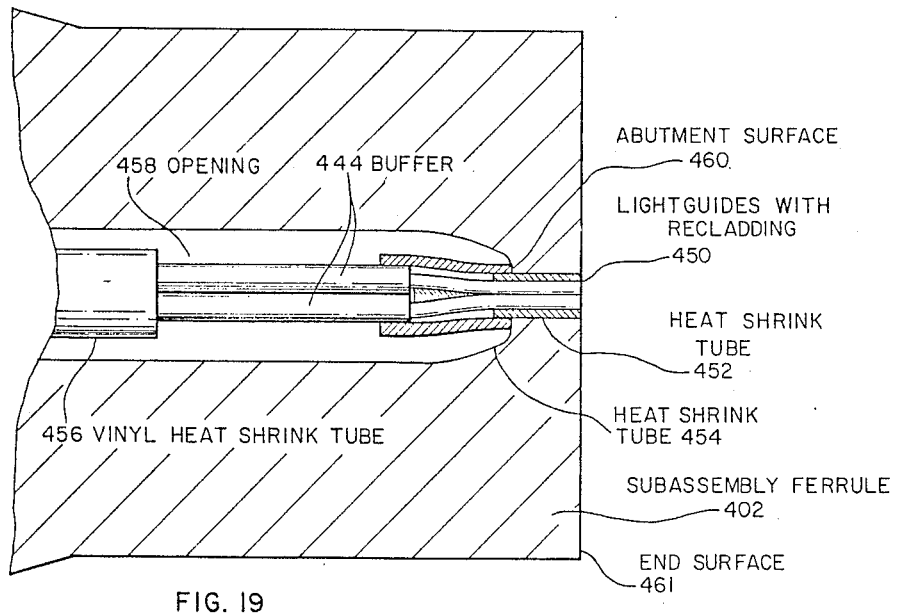
FIG. 19 is a schematic cut-away diagram of the fiber optic lightguides mounted in the sub-assembly ferrule.
Figure 32:
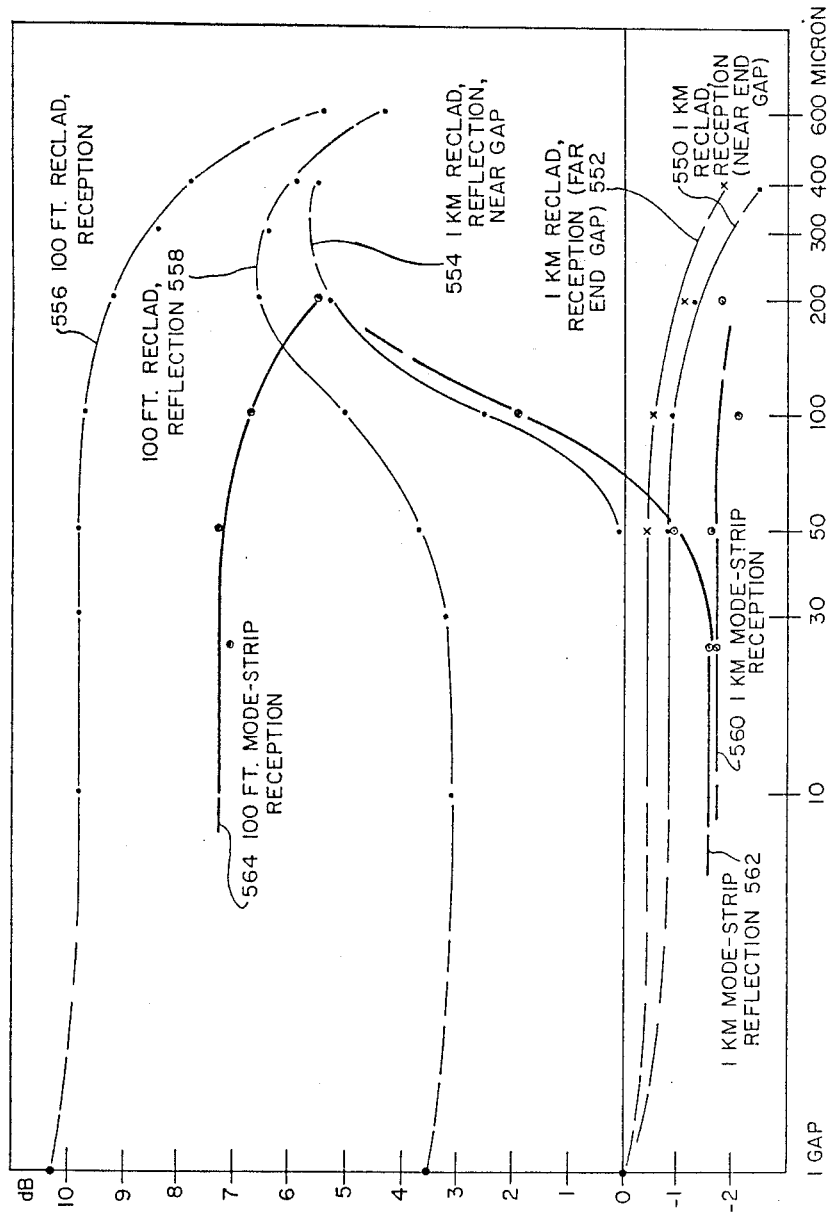
FIG. 32 is a graph of attenuation and reflection versus gap width in the combined coupler/connector.

FIG. 32 represents plots of relative forward attenuation and relative reflection of bi-directional fiber optic links, versus the width of the gap between the face of the coupler assembly and the face of the link cable. Each test link consisted of a length of 200 micron PCS cable, terminated according to the illustration in FIG. 30, connected to a bi-directional coupler at each end. A calibrated LED transmitter was used to launch a constant amount of light power into the transmit lightguide at the near end of the link and received power was measured from the receive lightguide at the far end of the link. A simultaneously reflected power reading was taken at the receive lightguide of the near end coupler. A dual head Photodyne model 22XLA fiber optic multimeter was used for all power readings. Two experimental "reclad" couplers built as depicted in FIG. 19, and two experimental "mode-stripping" couplers built essentially in accordance with FIG. 21, were tested. Four link configurations were measured, namely:

(1) A one kilometer link with two "reclad" couplers, one at the each end;
(2) A 100 ft. link with two "reclad" couplers;
(3) A one kilometer link with two "mode-stripping" couplers;
(4) A 100 ft. link two "mode-stripping" couplers.

Each link was measured twice in both directions and averages computed of the four readings.

Referring again to FIG. 32, function 550 illustrates the effect of the near-end gap (between the transmitting coupler and the link cable) on the signal received over a 1 km "reclad" link, relative to signal power measured with 1 micron gaps (=0 dB). It shows a flat level of −0.8 dB for gaps between 10 and 50 microns, beyond which the signal drops with increasing gap spacing.

Function 552 illustrates the effect of the far-end gap measured in the same set-up.

Function 554 illustrates a near-end reflection measured concurrently with function 550, relative to the reflection at 1 micron (=0 dB).

Function 554 shows reflection increasing considerably as the gap increases beyond 50 micron.

Function 556 discloses the signal energy received over a 100 ft link using a "reclad" coupler, versus the near gap, relative to the 1 km value at 1 micron (=0 dB reference).

Function 558 discloses the near end reflection, with a 100 ft link using "reclad" couplers, measured concurrently with function 556. For the near end gap of between 5 and 40 micron this reflection is fairly constant and it is approximately 3 dB higher than reflection from a kilometer link. The assumption is that in a short link reflection from the far end of the cable is added to, and causes the measured increase of, the reflection at the near end.

Function 560 discloses the reception over a 1 km link using "mode-stripping" couplers, measured under conditions otherwise identical to function 550.

Function 562 discloses the reflection from a 1 km link with "mode-stripping" couplers, measured concurrently with function 560.

Function 564 is a plot of reception over a 100 ft. link using "mode-stripping" couplers, measured to confirm the effect of mode-stripping on a short link loss (Ref. the table below).

From these results it has been determined that it is desirable to maintain the face to face spacing, in the present invention, between 5 and 40 microns.

FIG. 32 indicates that the baseline reflection from the shorter, 100 ft cable, is about 3 dB higher than from the long cable. This is due to the reflection of light from the far end of the cable which is understandably more prominent in the shorter cable. This effect can be controlled, in part, by defining a minimum attenuation of the link cable, e.g. minimum attenuation can be provided by using a minimum length cable. The bulk of customer interconnect requirements are between 100 ft and 1 km which is the range of the current invention using standard silica core cable. More lossy media, such as plastic core cables, can be used to maintain adequate reflection return attenuation in very short links (below 100 ft). Reflection can be further controlled by the finish as well as separation and alignment of the mating faces. As the link operates bi-directionally, the finish and separation gap of the end surfaces should be the same at both ends. It has been found that by judicious choice of surface roughness as set forth infra, at both the near and far end faces, the aggregate reflection can be maintained at an adequate level, even with short cables. Reduction in internal reflection within the link cable as a result of a predetermined surface roughness, e.g. rough polishing with 3 micron abrasive paper, is believed to result from the generation of higher order modes due to the angle at which transmitted radiation is reflected from the end surfaces of the link cable. These higher order modes of reflected radiation attenuate rapidly as they propagate through the link cable due to the higher angle of incidence with the link cable surface which causes attenuation at a rate proportional to the angle of incidence.

Additional control of reflection can be accomplished by surrounding a section of the lightguides with mode stripping medium. Light propagates through large core light guides in many modes distinguished by the angle between its trajectory and the direction of the lightguide. Zero order mode is defined as a mode propagating along the axis of the lightguide. The highest order modes hit the core's surface close to the critical angle of total internal reflection. Due to surface imperfections, high order modes tend to leak into the cladding and eventually get absorbed. It has been observed that after several hundred feet the highest modes are substantially removed from the link cable.

Mode stripping is a process whereby the removal of high order modes can be accelerated over a relatively short section of lightguide by reducing the thickness of cladding and surrounding it with a light absorbing material of higher index of retraction than the cladding. Such material is called a mode stripping medium.

The purpose of mode stripping is to remove, within the coupler, those higher order modes which are more likely to leak from one lightguide to another and cause harmful reflection, yet which contribute little to overall transmission over the longest link. Mode stripping increases the loss of shorter links since it removes the higher order modes normally capable of carrying some light across the short cable. The following table shows the effect of mode stripping in the current invention, where it favorably reduces reflection as well as the range of signal power between the shortest and the longest link.

| Mode Stripping: | Received Power | | Dynamic Range | Reflection @ 1 km |
| --- | --- | --- | --- | --- |
| | 100 ft | 1 km | | |
| No | −16 dBm | −26 dBm | 10 dB | −41 dBm |
| Yes | −18 dBm | −27 dBm | 8 dB | −43 dBm |

Additionally, the manner in which the fiber optic link cable is polished reduces the reflected signal intensity in the combined coupler/connector, as well as the use of index matching material in the combined coupler/connector, alignment of the link cable and lightguides so that the faces of the link cable and lightguides are parallel and perpendicular to a common axis, and the choice of a link cable with a minimum designed attenuation. The mechanical attachment of the fiber optic lightguides by the fluoropolymer shrink tube ensures fiber alignment and prevents divergence of light for better optical coupling efficiency. Optical coupling gels are also used to provide refractive index matching between the lightguides and the transmitter and receiver circuits.

Figure 16:
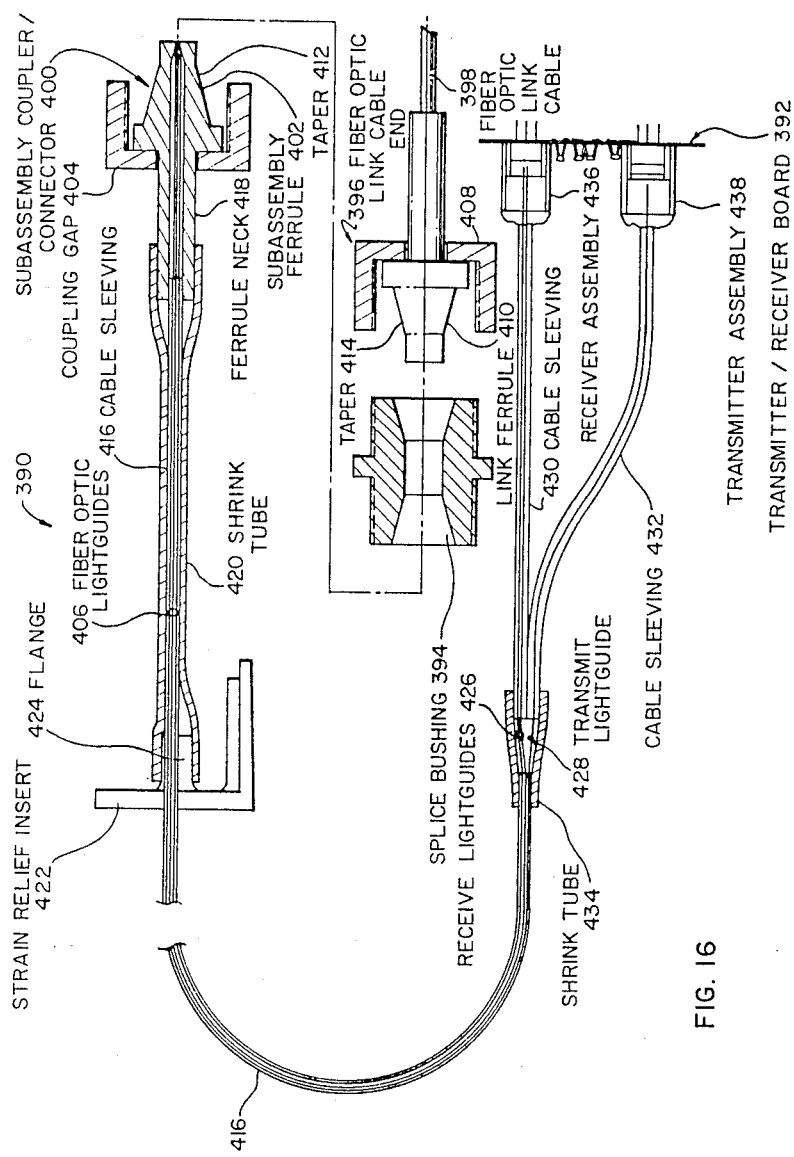
FIG. 16 comprises a schematic diagram of the sub-assembly device, splice bushing, fiber optic link cable and the transmitter receiver board.

FIG. 16 illustrates the sub-assembly device 390, transmitter receiver board 392, splice bushing 394, fiber optic link cable end 396 and fiber optic link cable 398. The sub-assembly device 390 utilizes a sub-assembly combination coupler/connector 400 which utilizes a sub-assembly ferrule 402 and screw coupling cap 404. Three fiber optic lightguides 406 are disposed in sub-assembly ferrule 402 so that sub-assembly coupler/connector 400 functions both as a connector for connecting the sub-assembly device 390 to fiber optic link cable 398 and a coupler which functions as an asymmetric bi-directional Y-coupler for transmitting and receiving signals on a single fiber optic link cable 398. Sub-assembly coupler/connector 400, splice bushing 394 and fiber optic link cable end 396 mechanically position the three fiber optic lightguides 406 in alignment with fiber optic link cable 398. Splice bushing 394 has tapers which match tapers 412, 414 on sub-assembly ferrule 402 and link ferrule 410, respectively. Caps 404, 408 position and hold sub-assembly ferrule 402 and link ferrule 410 on splice bushing 394 with the proper tension to ensure axial and angular alignment between fiber optic link cable 398 and fiber optic lightguides 406. Caps 404, 408 maintain proper longitudinal separation between the ends of sub-assembly ferrule 402 and link ferrule 410 when disposed in splice bushing 394. Axial alignment and angular alignment between the ends of fiber optic lightguides 406 and the end of fiber optic link cable 398 ensure minimal loss resulting from transmission and reception across the air gap maintained between sub-assembly ferrule 402 and link ferrule 410. An appropriate spacing of less than approximately one half of the core diameter of the smallest of the three bundled lightguides, e.g., 40 microns for 110 micron lightguiding, should preferably be maintained to ensure adequate coupling of optical energy, while maintaining a separation to prevent damage to the fiber cores of link cable 398 and lightguides 406 as a result of the ends of the fiber cores touching and causing damage to the surfaces of the fiber cores, which would otherwise reduce optical coupling efficiency. To control the longitudinal separation between the ends of sub-assembly ferrule 402 and link ferrule 410, both ferrules as well as splice bushing 394 in which the ferrules are disposed are preferably manufactured to predetermined tolerances. In the present invention, the preferred results are achieved by grinding the ferrules to 6.26±0.005 mm and grinding the splice bushing to 12.545±0.005 mm length. The splice bushing can also be around to eliminate larger tolerances in tbe plastic parts caused by the plastic molding process. The resulting preferred separation gap in the current invention is then $(12545 \pm 5) - 2 \times (6260 \pm 5) = 25 \pm 15$ micron. To increase optical coupling efficiency, an optical coupling gel can be used between the end of sub-assembly ferrule 402 and link ferrule 410 having an index of refraction which is substantially equal to the index of refraction of fiber optic link cable 398 and fiber optic lightguides 406. Use of an optical coupling gel reduces reflective losses at the air/glass interface of link cable 398.

Fiber optic lightguides 406 are mounted in sub-assembly ferrule 402, in a manner described infra, and cable sleeving 416 is placed over the fiber optic lightguides 406 and mounted in ferrule neck 418. Strain relief is provided by shrink tube 420 which is placed over the outer portions of cable sleeving 416, ferrule neck 418 and flange 424. Heat is applied to shrink tube 420 to prevent movement between strain relief insert 422 and ferrule neck 418 which might cause strain on fiber optic lightguides 406. Strain relief insert 422 is mounted directly in the fiber optic interface enclosure such that strain relief is integrated in the enclosure. In other words, forces produced on sub-assembly coupler/connector 400, or other portions of sub-assembly device 390, will be transmitted through strain relief insert 422 via strain relief projection 424 to the fiber optic interface device enclosure, thereby preventing strain from being produced on fiber optic lightguides 406 which might cause longitudinal displacement of the fiber optic lightguides 406 in sub-assembly ferrule 402. Additionally, cable sleeving 416 is mounted in strain relief insert 422 to further relieve strain on fiber optic lightguides 406, as a result of forces produced on the sub-assembly device 390, or the fiber optic link cable end 396 and fiber optic link cable 398.

Fiber optic lightguides 406 are threaded through cable sleeving 416. At the point at which the cable sleeving ends, the receive lightguides 426 are separated from the transmitter lightguide 428. Receive lightguides 426 are threaded through cable sleeving 430. Transmit lightguide 428 is threaded through cable sleeving 432. Shrink tube 434 is placed around the outer surface of cable sleeving 416, 430 and 432 and heat is applied to provide stain relief between each of the cable sleeving members. Receive lightguides 426 and cable sleeving 430 are attached to receiver assembly 436. Transmit lightguide 428 and cable sleeving 432 are connected to transmitter assembly 438. Receiver assembly 436 and transmitter assembly 438 are connected to transmitter receiver board 392 which is mounted on the mother board disposed within the fiber optic interface enclosure.

Figure 17:
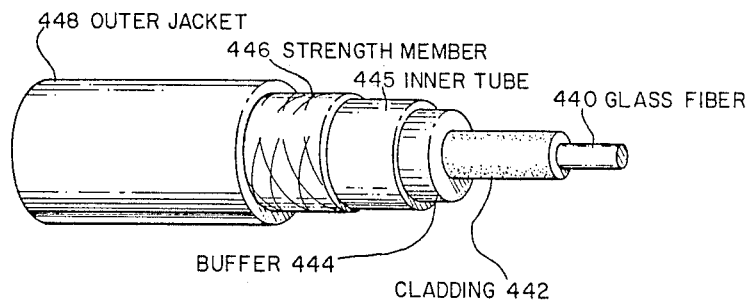
FIG. 17 is a schematic diagram of a fiber optic link cable.

FIG. 17 is a schematic diagram illustrating the components of a typical fiber optic link cable. The fiber optic link cable comprises a glass fiber core 440 having a cladding 440 formed concentrically around the outer surface of the glass fiber core 440. The cladding 442 comprises a material having an index of refraction which is less than the index of refraction of the glass fiber 442 so that total internal reflection of light travelling through glass fiber 240 occurs whenever the light impinges upon the interface of the glass core and cladding at any angle between the critical angle and the surface of the fiber. Glass fiber core 440 can vary in diameter in accordance with its use. In the present invention, fiber optic lightguides 406 have glass fiber cores which are approximately 110 microns in diameter, while fiber optic link cable 398 has a glass fiber core of approximately 200 microns in diameter. Using these diameters, the glass fiber cores of the three fiber optic lightguides 406 can easily align with the glass fiber core of the fiber optic link cable 398, when cable ferrule 410 and sub-assembly ferrule 402 are coupled together by splice bushing 394. In accordance with the present invention, the outer diameter of cladding 442 on lightguides 406 is approximately 125 microns, and the diameter of cladding 442 on link cable 398 is approximately 330 microns in diameter. These diameters provide substantial overlapping of the face of the 200 micron glass core of link cable 398 with the faces of the three 110 micron glass cores of lightguides 406 which are placed in a tightly spaced triangular configuration. Buffer 444 comprises a protective layer which surrounds cladding 242 to protect the cladding material form abrasion or other damage. Inner tube 445 provides an additional protective layer. Strength member 446 comprises a braided material, preferably of a polyaramid plastic, to provide strength and reduce strain on glass fiber 440. Outer jacket 448 comprises a PVC protective layer for strength member 446.

The optical fibers can comprise all glass fibers, i.e., glass on glass, plastic coated silica (PCS) and all plastic fibers. Plastic coated silica fibers have been used in accordance with the present invention having fused silica cores with a refractive index of 1.46 and a RTU type of silicone elastomer cladding having a thickness which is approximately 30% of the core diameter of the PCS fiber. Soft cladding can be stripped from the core and reclad applied to the core where close positioning of adjacent cores of other lightguides is required, e.g., the assembly of fiber optic lightguides in sub-assembly ferrule 402, as illustrated in FIG. 18. For grouping of lightguides in a closely spaced configuration to achieve the requisite optical coupling efficiency required by the present invention, the cladding material should be 4% to 15% of the diameter of the core of the optical fiber, but no more than 30%. Sufficient optical coupling efficiency is not achieved with the thicker cladding since thicker claddings take more space, reduces packing efficiency and consequently require coupling to fiber optic cables of greater diameter and lower efficiency.

FIG. 18 comprises a schematic diagram of the assembly of fiber optic lightguides 406 in sub-assembly ferrule 402 (FIG. 16). In forming the sub-assembly, three single fiber lightguides 406 are cut to length (as indicated by the distance between the sub-assembly ferrule 412 and transmitter/receiver board 392 in FIG. 16). Each lightguide 406 comprises a light guiding core having an optical cladding formed concentrically around it. The cladding maintains light trapped in the core by virtue of total internal reflections a result of the index of refraction of the cladding being less than the index of refraction of the core of the lightguide 406.

The lightguides are supplied with a protective buffer tube 444 and they are presently commercially available. In some lightguides the optical cladding comprises RTV silicone type material, while in some others there is a layer of hard cladding material between the glass core and the silicone cladding. Lightguides 406 can be all soft clad, all hard clad or any combination thereof. In either case, the outer silicone cladding is removed with the buffer 444 when the lightguides are prepared for assembly. Since the glass fibers 440 have such high purity, they must be protected after they have been exposed to the atmosphere to prevent absorption of moisture. Each of the exposed glass fibers is dipped in a reclad solution after being cut to prevent water absorption and degradation. The recladding solution preferably comprises a solution of approximately 26% kynar, 74% acetone and a fractional percentage of polycarbonate. Such recladding solutions are available commercially. The purpose of claddding on the fiber optic core is to guide light within the core by creating a radial drop in the index of refraction. When cladding is stripped for termination or assembly of the optical fiber, the core must be reclad to prevent loss of light. Fluoropolymers, such as TFE (Teflon), in the form of heat shrinkable tube work well to provide a lower index of refraction layer around the core of the material and help to guide light through the core of the optical fiber by reducing light divergence. The length of fiber required between sub-assembly ferrule 402, and receiver assembly 436 and transmitter assembly 438 (FIG. 16), is measured and cleaved at the receiver and transmitter assembly ends, in the manner described infra.

Figure 20:
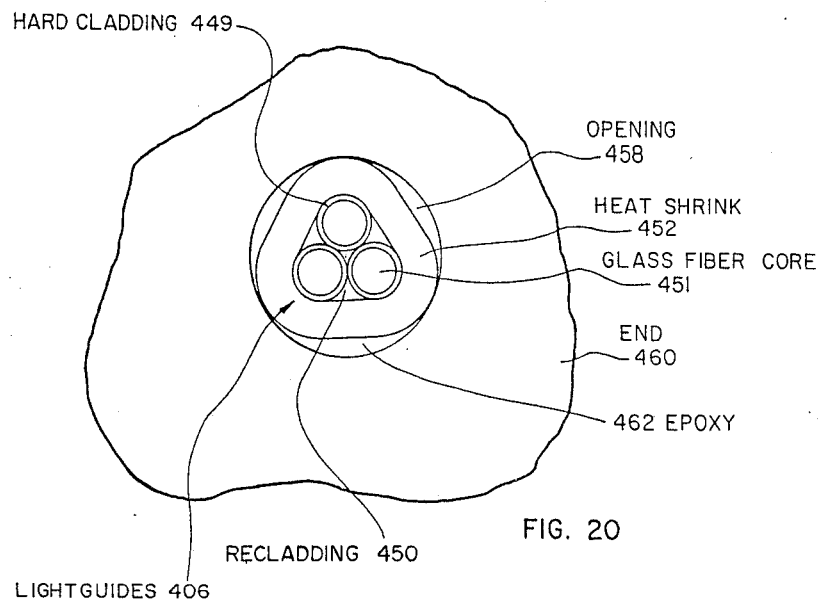
FIG. 20 is an end view of the sub-assembly ferrule and fiber optic lightguides mounted therein.

Referring again to FIG. 18, after recladding 450 has been applied to fiber optic lightguide 406, a fluoropolymer (TFE) heat shrink tube 45, such as a Teflon brand of fluoropolymer is placed over the ends of fiber optic lightguides 406 to hold the fiber optic lightguides 406 in a closely spaced triangular configuration. The closely spaced triangular configuration provides a naturally self-supporting structure having an outer surface area which automatically provides for self-centering in the sub-assembly ferrule. Recladding 450 which is relatively soft, conforms to the compression of the shrunk tube 452 by filling the voids between lightguides 406 within heat shrink tube 452 (Ref. FIG. 20). The self-supporting triangular configuration allows the fibers to be closely spaced to one another in a configuration which is not prone to self-movement or misalignment. In addition to holding fiber optic lightguides 406 in a tightly spaced triangular configuration, heat shrink tube 452 also functions in conjunction with recladding 450, to maintain light which is transmitted and received by fiber optic lightguides 406 in an axial direction, since heat shrink tube 452 has an index of refraction which is lower than the glass core of glass fiber 440. After heat shrink tube 452 is applied to fiber optic lightguides 406, an additional fluoropolymer heat shrink tube 454 is placed between and over the ends of heat shrink tube 452 and buffer 444 to provide strain relief and support to the structure. Vinyl heat shrink tube 456 is then placed over the buffer portion of the fiber optic lightguides 406 to provide additional support to the assembly.

FIG. 19 discloses the fiber assembly illustrated in FIG. 18 mounted in sub-assembly ferrule 402. The fiber assembly illustrated in FIG. 18 is inserted in opening 458 of sub-assembly ferrule 452 until heat shrink tube 454 abuts against abutment surface 460 in opening 458. At the point at which heat shrink tube 454 abuts against abutment surface 460, the glass fiber and recladding extend slightly from the end surface 461 of sub-assembly ferrule 402. The closely spaced triangular configuration causes the fiber optic assembly to be self-centered in ferrule 402. After the fiber optic assembly is placed in sub-assembly ferrule 402, a syringe is used to inject low viscosity epoxy in the void areas of opening 458. Any commercially available low viscosity curable epoxy resin is suitable for use. After the epoxy is allowed to harden, the glass fiber cores and recladding 450 which extend beyond the end surface of sub-assembly ferrule 402 is removed by air abrasive cutting. The entire assembly illustrated in FIG. 19 is then stress-relieved for 48 hours to allow the epoxy to fully cure and thereby prevent pistoning of the fiber optic lightguide.

The end surface of the sub-assembly ferrule 402 is then rough polished with 15 micron abrasive disc or the like mounted on a turntable. A 6.3 millimeter long polishing bushing is used for rough polishing on the 15 micron abrasive disc. The ferrule end surface is then final polished on 3 micron abrasive disc using a polishing bushing of 6.26 millimeters. The entire surface is then cleaned with nitrogen and a dust cap is placed over the end surface of the sub-assembly ferrule 402. The fiber optic lightguide 406 are then threaded through cable sleeving 416 and shrink tube 420 is placed over cable sleeving 416, ferrule neck 418 and flange 424 of strain insert 422, as illustrated in FIG. 16. Heat is then applied to shrink tube 420 and a hot melt adhesive on the inner surface of shrink tube 420 adheres shrink tube 420 to ferrule neck 418 and flange 424. Receive lightguides 426 are then separated from transmit lightguide 428 and cable sleeving 430, 432 is placed over the respective lightguides. Shrink tube 434 is then applied to cable sleeving 416 and cable sleeving 430, 432, as described above, to provide strain relief. A small amount of adhesive is applied to the end portions of cable sleeving 430, 432 to attach the fiber optic lightguides 406 to cable sleeving 430, 432.

FIG. 20 is an end view of sub-assembly ferrule 402. As illustrated in FIG. 20, end surface 460 has an opening 458 formed therein, in which lightguides 406 are disposed. As clearly illustrated in FIG. 20, fluoropolymer heat shrink tube 452 mechanically aligns the glass fibers in a closely spaced triangular configuration so that the glass fibers are centrally aligned in opening 458. The remaining spaces around lightguides 450 are then substantially filled with recladding 450. The proper alignment is then provided by the closely spaced triangular configuration and the use of a fluoropolymer heat shrink tube 452 of the proper cross-sectional thickness to fit within opening 458. Epoxy 462 holds the glass fibers and recladding 450 in place in the sub-assembly ferrule 402.

An alternative assembly method is available using those lightguides which exhibit a hard cladding material over the light guiding glass core. In this case the protective buffer 444 and the silicone cladding material are stripped, but the lightguide need not be reclad as the core is still protected with the hard cladding layer, as illustrated in FIG. 21.

In the current invention hard clad fiber optic lightguides are used in which the lightguiding core diameter is about 110 microns and the thickness of the hard cladding is approximately 7 microns. This thin cladding allows some portion of light incident at higher angles to leak across the core-cladding boundary. The beams of such higher angle of incidence are known as higher order modes of light propagation and it has been determined that they contribute substantially to the reflection of light backwards at the glass-air-glass boundary in the combined coupler/connector. When the lightguide is surrounded with light absorbing medium over a sufficient length, the leaking higher order modes are removed by process known as mode stripping, resulting in lower reflection at coupler/connector sub-assembly 400.

Figure 21:
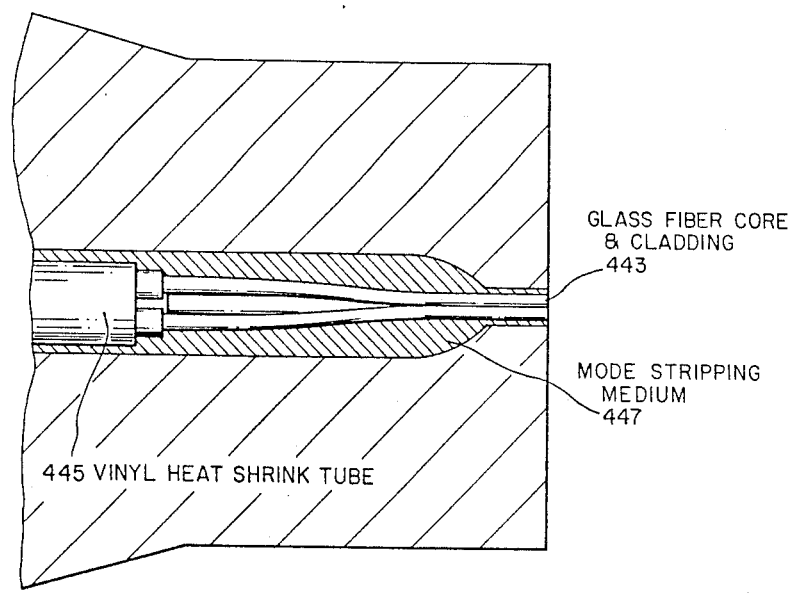
FIG. 21 is a schematic cut-away diagram of the fiber optic lightguides surrounded by a mode-stripping medium within the sub-assembly ferrule.

FIG. 21 discloses the alternative assembly employing a mode stripping medium disposed in sub-assembly ferrule 402. The protective buffer 444 and silicone cladding are removed so that approximately ½ inch of the clad lightguide is exposed. The lightguides comprising the glass fiber core and hard cladding 443 are held in a tight triangular configuration by the vinyl heat shrink tube 445 and introduced in the sub-assembly ferrule 402 which is filled with mode stripping medium 447, which is a commercially available black potting epoxy compound. Some excess length of the three lightguides is allowed to extend beyond the end of the ferrule, where the lightguides are held in position by a centering orifice until the mode stripping medium 447 has hardened.

After the mode stripping medium has cured, any excess lightguides and mode stripping medium are trimmed by air abrasive cutting and the rest of the process is identical to that described in connection with FIG. 19.

Figure 22:
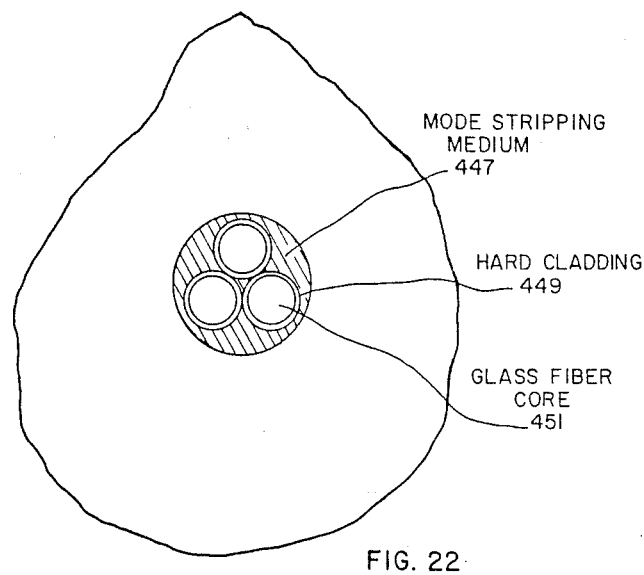
FIG. 22 is an end view of the sub-assembly ferrule and fiber optic lightguides surrounded with the mode-stripping medium.

FIG. 22 shows the end surface of the finished sub-assembly ferrule 402 assembled with the mode stripping medium 447, indicating the space around and between hard cladding 449 filled with the mode stripping medium 447. The manner in which hard cladding 449 surrounds glass fiber core 451 is also illustrated in FIG. 22.

FIGS. 23 through 25 illustrate strain relief insert 422. FIG. 23 is a top view of strain relief insert illustrating the manner in which strain relief projection 424 protrudes from vertical portions 464. Horizontal portion 466 joins vertical portion 464 at a substantially right angle, as further illustrated in FIG. 25. FIG. 24 discloses opening 468 formed in vertical portion 464 which functions to hold the fiber optic lightguides 406 and cable sleeving 416 in a fixed relationship after heat shrink tube 420 has been secured to flange 424.

FIG. 26 comprises an exploded cut-away view of the components of the receiver assembly 436. As illustrated in FIG. 26, the receiver assembly 436 comprises a PIN diode which is capable of detecting IR radiation transmitted by receive lightguides 426. PIN diode 470 is mounted on a standard TO-18 base having a predetermined outside diameter. Brass sleeve 472 has an inner diameter which allows brass sleeve 472 to be placed over the outer surface of PIN diode 470. In a similar manner, brass sleeve 472 has an outer diameter which fits within the inner diameter of quartz tube 474, in the manner illustrated in FIG. 26.

FIG. 27 is a top view of PIN diode 470. Detector surface 476 is disposed on the top of PIN diode upper surface 478. PIN diode 470 is received from the manufacturer without a protective window over the PIN diode upper surface 478 such that detector surface 476 is directly open to the environment. FIG. 27 also illustrates the manner in which receive lightguides 426 are positioned over detector surface 476. A fluoropolymer heat shrink tube 482 holds receive lightguides 426 in a closely spaced configuration adjacent the end portions of receive lightguides 426. The receive lightguides 426 are aligned with the longitudinal direction of detector surface 476 and centered thereon to provide maximum transmission of light from receive fibers 426 onto detector surface 476. Heat shrink tube 482 prevents divergence of light to provide better optical coupling efficiency.

FIG. 28 comprises a side cut-away view of receiver assembly 436. Optical coupling gel 484 with a refractive index of approximately 1.4 to 1.5 is placed over the PIN diode upper surface 478 adjacent detector surface 476 and is maintained within brass sleeve 472. A typical optical gel suitable for use with the present invention comprises a soft dielectric gel having a refractive index of approximately 1.407. Optical coupling gel 484 is a silicon gel having an index of refraction which approximates the index of refraction of receive fibers 476 to increase optical coupling efficiency between receive lightguides 426 and detector surface 476. The optical coupling gel comprises a conformal coating which functions to fill the air gap between the receive lightguides and the detector surface, and it seals PIN diode upper surface 478 from the environment.

The receive lightguides 426 are positioned above the detector surface 476, as illustrated in FIG. 27, and a UV curable adhesive 486 is placed in the reservoir formed by quartz tube 474. Typical UV curable adhesive suitable for use with the present invention include those currently used in optical assemblies. UV curable adhesive 486 extends beyond the upper surface of quartz tube 474 to ensure that the lower portion of cable sleeving 430 is secured by UV curable adhesive 486 so as to provide a secure assembly. When receiver fibers 426 are properly positioned in the receiver assembly 436, UV radiation is applied to UV curable adhesive 486 to secure the receive fibers and cable sleeving 430 in receiver assembly 436.

Figure 29:
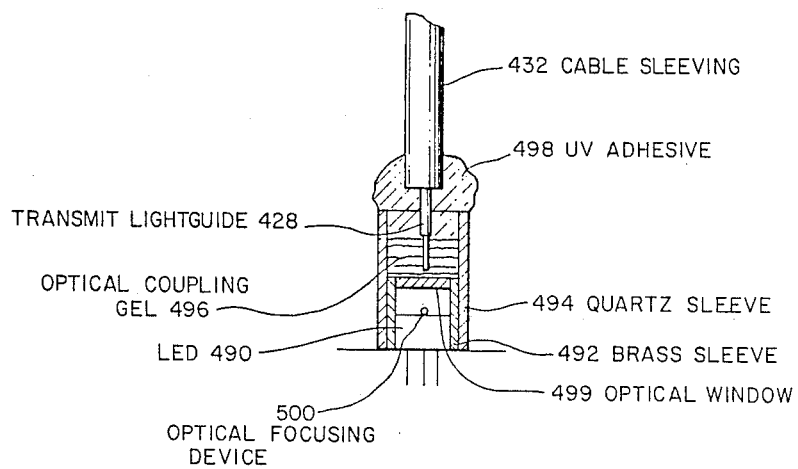
FIG. 29 is a cut-away view of the transmitter assembly.

FIG. 29 is a schematic cut-away view of transmitter assembly 438. Transmitter assembly 438 uses a light emitting diode 490 which is capable of transmitting infrared light at approximately 820 nanometers. The supporting structure of LED 490 is surrounded by a brass sleeve 492, which is in turn surrounded by quartz sleeve 494, in the same manner as receiver assembly 436, illustrated in FIG. 26. Also, an optical coupling gel 496 is disposed within quartz sleeve 494 to increase optical coupling efficiency. Transmit lightguide 428 is positioned on optical window 499 in alignment with optical focusing device 500 to provide a balance between transmitted and reflected light. When properly positioned, transmit fiber 428 and cable sleeving 432 are secured in place by UV curable adhesive 498. Optical coupling gel 496 can be replaced with a clear UV curable adhesive with a refractive index which is capable of increasing optical coupling efficiency.

In order to provide a proper surface for receipt and transmission of data in and out of transmit and receive lightguides 428, 426, the ends of the fiber cores must be cleaved in a particular manner to create a smooth perpendicular end surface. Cleaving is achieved by applying a predetermined bending moment and a predetermined tension to each lightguide. The glass core is then scored along the outer radial surface to create a crack which propagates through the fiber so as to form a damage-free surface. The crack must propagate at a predetermined speed dependent upon the tension and bending moment to prevent imperfections on the cleaved surface.

The manner in which receiver assembly 436 and transmitter assembly 438 are assembled is referred to as pigtailing. The pigtailing procedure requires the use of a micro-positioner which comprises a five axis positioner for aligning receive lightguide 426 with PIN diode 470 and transmit fiber 428 with optical focusing device 500. Receive lightguides 426 are aligned with the longitudinal direction of detector surface 476 and positioned for a maximum output reading on PIN diode 470. The receiver assembly 436 is assembled prior to assembly of transmitter assembly 438. Transmit lightguides 428 is subsequently aligned by maximizing the transmitted light at sub-assembly coupler/connector 400, while minimizing the output of receiver assembly 436 as a result of reflections at sub-assembly coupler/connector 400. In the manufacturing process, transmit lightguide 428 is aligned to produce a desired level of transmitted light while maintaining the level of the reflected signal detected by receiver assembly 436 below a set limit.

The manner in which the ends of the sub-assembly link cable 398 are polished minimizes reflections between transmit lightguide 428 and receive lightguides 426 at the interface point between link ferrule 410 and sub-assembly ferrule 402 in sub-assembly coupler/connector 400. The final polishing using 3 micron abrasive paper produces a surface which is sufficiently rough to diffuse the reflected energy at the air/glass interface of fiber optic link cable 398. This procedure, in combination with the high tolerance alignment and spacing of sub-assembly ferrule 402 and cable ferrule 410, and the alignment of receiver assembly 436 and transmitter assembly 438, allow simultaneous distinguishable bi-directional optical communication of data using a combined coupler/connector which is convenient and easy to use. Additionally, the precise setting of threshold levels in the fiber receiver and data decoder 94 using resistor 224 in combination with the use of a link cable having a minimum designed attenuation, resulting from either the particular materials used and/or the length of the cable, ensures that reflected signals at the combined coupler/connector will not be detected as received signals.

Figure 30:
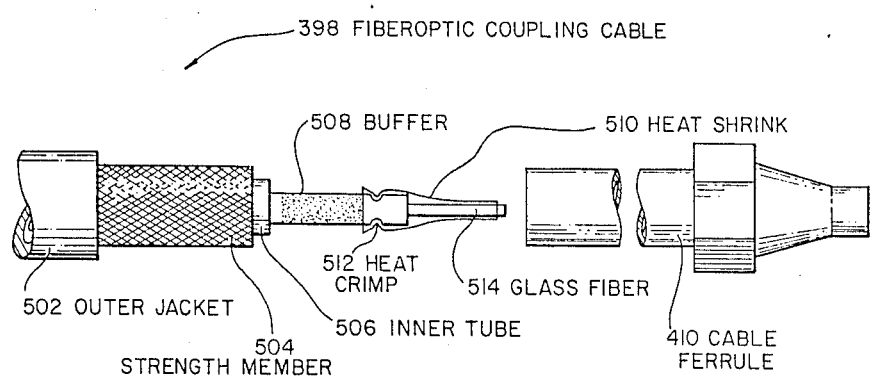
FIG. 30 is a schematic side view of the fiber optic link cable illustrating cable end preparation prior to assembly on the cable ferrule.

FIG. 30 is a schematic side view of fiber optic link cable 398 (FIG. 16). FIG. 30 illustrates the manner in which the end of the fiber optic link cable 398 is prepared prior to insertion in cable ferrule 410. First, outer jacket 502, strength member 504, innertube 506, and buffer 508 are stripped to the proper lengths. Both the buffer 508 and cladding surrounding glass fiber 514 are stripped. Glass fiber 514 is then dipped into a recladding solution. Buffer 508 is then abraded with sandpaper to produce a coarse layer. A fluoropolymer of heat shrink tube 510 is placed over the end portion of buffer 508 and glass fiber 514. The heat shrink 510 is heat crimped at a location 512 to hold heat shrink 510 in the proper position. Heat is then applied to the heat shrink 510 to shrink heat shrink 510 over glass fiber 514. The cable end is then inserted in the ferrule 410 until it abuts against the inner taper in the ferrule. Glass fiber 514 and heat shrink 510 protrude slightly from the end of cable ferrule 410. The cable end is bonded to the ferrule with epoxy using a bonding fixture device. A heat shrink tube (not shown) is placed over the outer jacket 502 and cable ferrule 410 to provide strain relief. The entire assembly is then placed in the oven to cure. After curing, the protruding fiber is abrasively removed from the tip of the ferrule by air abrasive cutting. The assembly is then allowed to sit for 48 hours so that the epoxy can fully cure and thereby provide stress relief. The end of the ferrule is then polished in the same manner as the coupler to produce the substantially non-mirrored surface.

Figure 31:
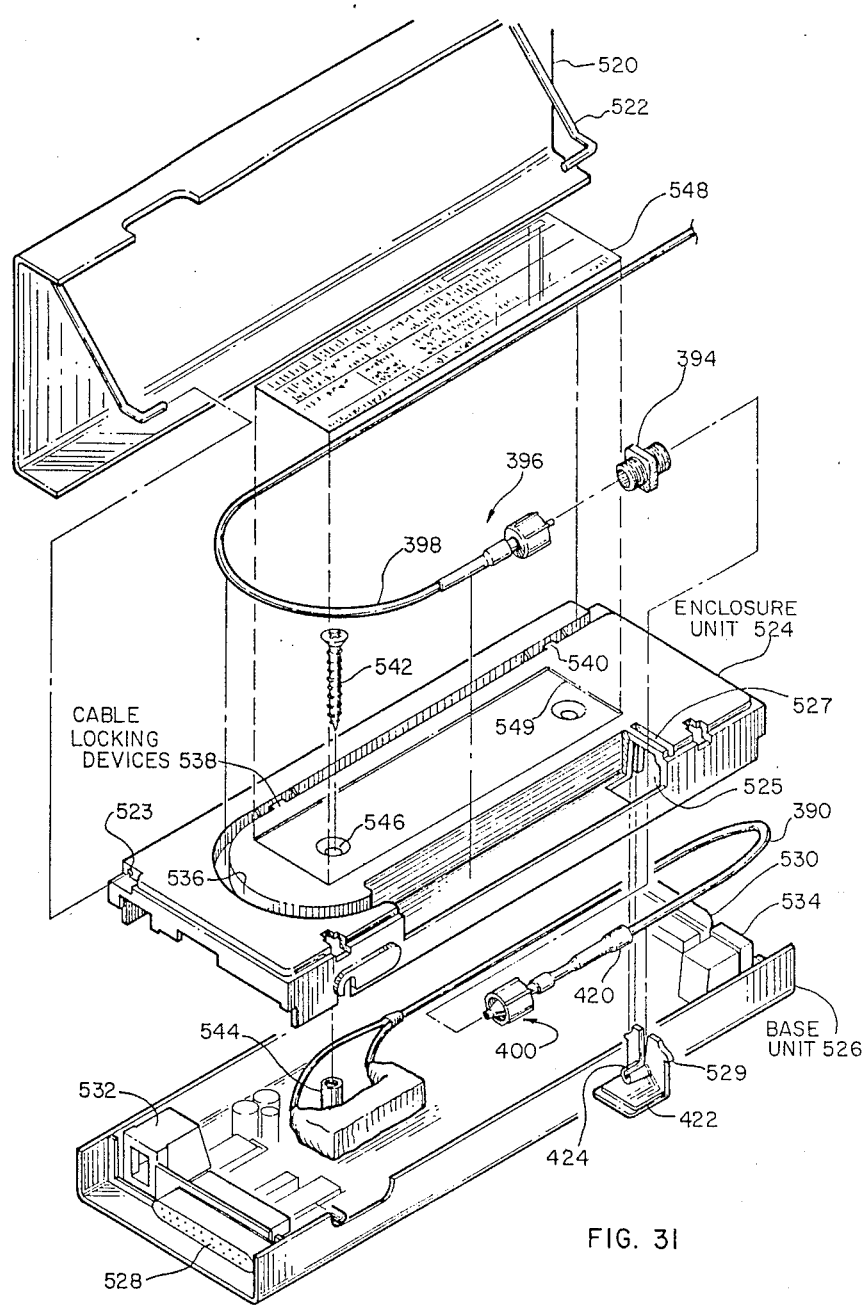
FIG. 31 is an exploded schematic view of the fiber optic interface device.

FIG. 31 comprises an exploded schematic view of the fiber optic interface device 10 of the present invention. Fiber optic interface unit 10 employs a protective lid 520 which is connected to enclosure 524 by way of wire hinge 522 which is disposed in holes 523. Enclosure unit 524 is coupled to base unit 526 by way of screws 542 disposed through holes 546 and mounted in posts 544 and which are covered by label 548 received in recess 549 to cover the recessed screwhead (542). Subassembly coupler/connector 400 is disposed through opening 525 in enclosure unit 524 upon assembly. Shrink tube 420 of subassembly 390 is secured to flange 424 of strain relief insert 422 by applying heat to shrink tube 420, as described above. Strain relief insert 422 is then mounted in enclosure unit 524 by inserting strain relief insert 422 in opening 527. Flange portions 529 resiliently expand in opening 527 and hold strain relief insert 422 in rigid engagement with enclosure unit 524. In this manner, subassembly 390 is integrally secured to enclosure unit 524 to provide strain relief for subassembly 390. Fiber optic link cable 398 is inserted in rounded groove 536 having a predetermined radius of curvature which is sufficiently large to allow transmission of optical data through fiber optic link cable 398 without significant attenuation. Cable locking devices 538, 540 are formed in enclosure unit 524 and function to securely hold fiber optic link cable 398 in engagement with enclosure unit 524 to provide strain relief for fiber optic link cable end 396. Disposed in each base unit 526 are two plug units 528, 530 which comprise electronic serial data ports such as RS232 electronic serial data ports. Additionally, two plug units 532, 534 comprise power plugs for applying auxiliary power to the fiber optic interface unit 10. Consequently, auxiliary power can be applied at either end of the unit depending upon which is more convenient for the user.

Consequently, the present invention provides an optical communication device which is capable of simultaneous bi-directional transmission of optical energy over a single fiber optic link cable at high data transmission rates using a inexpensive device which is capable of operating with or without auxiliary power. The system provides maximum data security with total immunity to EMI/RFI. Resource sharing is achieved between multiple user devices by transmission of state operational signals between fiber optic interface units. Simultaneous bi-directional transmission eliminates the need for expensive multiplexing devices associated with each user unit. LED indicator lights provide information to the user as to the current state of operation of the units, as well as functioning as a continuity monitor to maintain data and transmission integrity and security against eavesdropping and data link taps. Bridging of units provides for extended range capabilities and networking between multiple user stations.

The assembly of the fiber optic cable units and the use of an insert which is integrated into the fiber optic interface enclosure provides strain relief to the fiber optic lightguides utilized in the present invention and, consequently, increases the reliability and durability of the system. Use of a standard connector ferrule as both a connector and coupler, reduces costs and provides a more convenient system for the user and installer. The combined coupler/connector can also be easily cleaned so as to minimize maintenance costs. The use of a fluoropolymer heat shrink tube provides precise mechanical alignment of the lightguides and link cable as well as decreasing light divergence at the fiber optic lightguides ends. Use of the reclad solution after cutting and stripping the optical lightguides protects the integrity of the glass core as well as decreasing light divergence and enhancing optical coupling efficiency. Use of a mode stripping medium in the ferrule provides for the removal of higher order modes of light guidance, thereby reducing the amount of reflection resulting from the higher order modes.

The foregoing description of the invention has been present for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A fiber optic coupling device for bi-directional transmission of optical signals within a range of wavelengths between a fiber optic link cable and a transmitter/receiver comprising:
   receive lightguide for guiding optical input signals over said range of wavelengths to said transmitter/receiver;
   transmit lightguide for transmitting optical output signals substantially within said range of wavelengths from said transmitter/receiver;
   coupler/connector means, operating without wavelength multiplexing, for axially and angularly aligning said transmit and receive lightguides with said fiber optic link cable;
   said coupler/connector means or said fiber optic link cable reducing the intensity of reflected optical signals
   thereby allowing simultaneous distinguishable bi-directional optical communication of data within said range of wavelengths.

2. The device of claim 1 wherein said coupler/connector further comprises connector means for maintaining one end face of each of said transmit and receive lightguides parallel to and a predetermined longitudinal distance from an end face of said fiber optic link cable.

3. The device of claim 2 wherein said predetermined longitudinal distance is from 5 to 40 microns.

4. The device of claim 1 wherein said receive and transmit lightguides comprise:
   fiber optic core means having a predetermined core diameter; and
   cladding means surrounding said fiber optic core means having a thickness which is from 4 percent to 30 percent of said predetermined core diameter so that said fiber optic core means of said receive and transmit lightguides may be closely spaced within said coupler/connector to maximize their packing ratio while maintaining low leakage between said fiber optic core means.

5. The device of claim 4 wherein said coupler/connector further comprises connector means for maintaining one end face of each of the transmit and receive lightguides parallel to and a predetermined longitudinal distance from an end face of said fiber optic link cable.

6. The device of claim 5 wherein said predetermined longitudinal distance is less than about one-half of said predetermined core diameter.

7. The device of claim 4 wherein said receive lightguide includes at least two optical fibers and said transmit lightguide includes at least one optical fiber.

8. The fiber optic coupling device of claim 1 wherein said coupler/connector means together with said fiber optic link cable attenuate reflected optical signals to ensure that reflected signals will not be detected as received signals, allowing said simultaneous distinguishable bi-directional optical communication of data within said range of wavelengths.

9. A fiber optic coupling device for bi-directional transmission of optical signals within a range of wavelengths comprising:
   receive lightguide including first core and cladding for guiding optical input signals over said range of wavelengths to a transmitter/receiver;
   transmit lightguide including second core and cladding for transmitting optical output signals substantially within said range of wavelengths from said transmitter/receiver;
   fiber optic link cable including third core and cladding, said third core having larger diameter than each of said first and second cores;
   coupler/connector means, operating without wavelength multiplexing, for maintaining said transmit and receive lightguides in a closely spaced configuration and axially and angularly aligning said transmit and receive lightguides with said fiber optic link cable;
   said coupler/connector means or said fiber optic link cable reducing the intensity of reflected optical signals
   thereby allowing simultaneous distinguishable bi-directional optical communication of data within said range of wavelengths.

10. The device of claim 9 wherein said third core substantially overlaps both said first core and said second core.

11. The device of claim 9 wherein said first and second claddings surround said first and second cores, respectively, and have thicknesses which are from 4 percent to 30 percent of the diameters of said first and second cores, respectively, so that said first and second cores may be closely spaced within said coupler/connector to maximize their packing ratio while maintaining low leakage between said cores.

12. The fiber optic coupling device of claim 9 wherein said coupler/connector means together with said fiber optic link cable attenuate reflected optical signals to ensure that reflected signals will not be detected as received signals, allowing said simultaneous distinguishable bi-directional optical communication of data within said range of wavelengths.

13. The device of claim 9 wherein said coupler/connector further comprises connector means for maintaining one end face of each of said transmit and receive lightguides parallel to and a predetermined longitudinal distance from an end face of said fiber optic link cable.

14. The device of claim 13 wherein said predetermined longitudinal distance is about one-half the smaller of the diameters of said first and second cores.

15. A bi-directional fiber optic communication device comprising:
receiver for detecting optical input signals, said optical input signals comprising first modulated light within a band of wavelengths corresponding with an LED output, and for generating electrical input signals in response thereto;
transmitter for producing optical output signals, said optical output signals comprising second modulated light within said band of wavelengths, in response to electrical output signals;
receive lightguide connected to said receiver for guiding said optical input signals thereto;
transmit lightguide connected to said transmitter for transmitting said optical signals therefrom;
coupler/connector means for axially and angularly aligning said transmit and receive lightguides with a fiber optic link cable said coupler/connector or said fiber optic link cable reducing the intensity of reflected optical signals; thereby providing for simultaneous bi-directional coupling of said optical input and output signals between said transmit and receive lightguide means and said fiber optic link cable.

16. The device of claim 15 wherein said coupler/connector further comprises connector means for maintaining one end face of each of said transmit and receive lightguides parallel to and a predetermined longitudinal distance from an end face of said fiber optic link cable.

17. The device of claim 16 wherein said predetermined longitudinal distance is from 5 to 40 microns.

18. The device of claim 15 wherein said receive and transmit lightguides comprise:
fiber optic core means having a predetermined core diameter; and
cladding means surrounding said fiber optic core means having a thickness which is from 4 percent to 30 percent of said predetermined core diameter so that said fiber optic core means of said receive and transmit lightguides may be closely spaced within said coupler/connector to maximize their packing ratio while maintaining low leakage between said fiber optic core means.

19. The device of claim 18 wherein said coupler/connector further comprises connector means for maintaining one end face of each of the transmit and receive lightguides parallel to and a predetermined longitudinal distance from an end face of said fiber optic link cable.

20. The device of claim 19 wherein said predetermined longitudinal distance is less than about one-half of said predetermind core diameter.

21. An optical fiber transmission system for simultaneous bi-directional transmission of optical signals comprising:
first transmitter/receiver means for detecting optical input signals over a range of wavelengths and generating first electrical input signals in response thereto, and for producing optical output signals in a band of wavelengths substantially within said range of wavelengths in response to first electrical output signals;
second transmitter/receiver means for detecting said optical output signals over said range of wavelengths and generating second electrical input signals in response thereto, and for producing said optical input signals substantially within said band of wavelengths in response to second electrical output signals;
fiber optic link cable for transmitting said optical input and output signals between said first and second transmitter/receivers;
coupler/connector means at each end of said fiber optic link cable to attach said link cable to said first and second transmitter/receivers said coupler/connector or said fiber optic link cable reducing the intensity of reflected optical signals thereby allowing simultaneous distinguishable bi-directional communication of said optical input and output signals within said range of wavelengths.

22. The transmission system of claim 21 wherein:
said first and second transmitter/receiver means include transmit lightguides and receive lightguides for transmitting said optical output and input signals to and from said fiber link cable; and
said coupler/connector means axially and angularly aligns an end face of each of said transmit and receive lightguides with an end face of said fiber optic link cable.

23. The transmission system of claim 22 wherein said coupler/connector further comprises connector means for maintaining one end face of each of said transmit and receive lightguides parallel to and a predetermined longitudinal distance from an end face of said fiber optic link cable.

24. The transmission system of claim 23 wherein said predetermined longitudinal distance is from 5 to 40 microns.

25. The transmission system of claim 24 wherein said receive and transmit lightguides comprise:
fiber optic core means having a predetermined core diameter; and
cladding means surrounding said fiber optic core means having a thickness which is from 4 percent to 30 percent of said predetermined core diameter so that said fiber optic core means of said receive and transmit lightguides may be closely spaced within said coupler/connector to maximize their packing ratio while maintaining low leakage between said fiber optic core means.

26. The transmission system of claim 25 wherein said coupler/connector further comprises connector means for maintaining one end face of each of said transmit and receive lightguides parallel to and a predetermined longitudinal distance from an end face of said fiber optic link cable.

27. The transmission system of claim 26 wherein said predetermined longitudinal distance is less than about one-half of said predetermined core diameter.

28. The transmission system of claim 22 wherein:
each said transmit lightguide includes first fiber optic core and cladding;
each said receive lightguide includes second fiber optic core and cladding; and
said fiber optic link cable includes third fiber optic core and cladding, said third fiber optic core having a diameter greater than that of said first and second fiber optic cores.

29. The device of claim 1 wherein said fiber optic link cable has a preselected minimum length for reducing the intensity of reflected optical signals.

30. The device of claim 1 wherein said fiber optic link cable includes at least one rough polished end face for reducing the intensity of reflected optical signals.

31. The device of claim 1 wherein said coupler/connector means includes mode stripping means adjacent said transmit and receive lightguides for reducing the intensity of reflected optical signals.

32. The device of claim 9 wherein said fiber optic link cable has a preselected minimum length for reducing the intensity of reflected optical signals.

33. The device of claim 9 wherein said fiber optic link cable includes at least one rough polished end face for reducing the intensity of reflected optical signals.

34. The device of claim 9 wherein said coupler/connector means includes mode stripping means adjacent said transmit and receive lightguides for reducing the intensity of reflected optical signals.

35. The device of claim 15 wherein said fiber optic link cable has a preselected minimum length for reducing the intensity of reflected optical signals.

36. The device of claim 15 wherein said fiber optic link cable includes at least one rough polished end face for reducing the intensity of reflected optical signals.

37. The device of claim 15 wherein said coupler/connector means includes mode stripping means adjacent said transmit and receive lightguides for reducing the intensity of reflected optical signals.

38. The device of claim 21 wherein said fiber optic link cable has a preselected minimum length for reducing the intensity of reflected optical signals.

39. The device of claim 21 wherein said fiber optic link cable includes at least one rough polished end face for reducing the intensity of reflected optical signals.

40. The device of claim 21 wherein said coupler/connector means includes mode stripping means adjacent said transmit and receive lightguides for reducing the intensity of reflected optical signals.

* * * * *